(12) United States Patent
Blair

(10) Patent No.: US 9,253,131 B2
(45) Date of Patent: Feb. 2, 2016

(54) SYSTEM AND METHOD FOR AUTHENTICATION OF COMMUNICATIONS

(71) Applicant: Christopher Douglas Blair, South Chailey (GB)

(72) Inventor: Christopher Douglas Blair, South Chailey (GB)

(73) Assignee: SOFTWARE HOTHOUSE LTD., South Chailey (GB)

( * ) Notice: Subject to any disclaimer, the term of this patent is extended or adjusted under 35 U.S.C. 154(b) by 64 days.

(21) Appl. No.: 14/064,073

(22) Filed: Oct. 25, 2013

(65) Prior Publication Data

US 2014/0123261 A1    May 1, 2014

(30) Foreign Application Priority Data

Oct. 25, 2012    (GB) .................................... 1219235.7

(51) Int. Cl.
*H04L 29/06*    (2006.01)
*H04L 12/58*    (2006.01)
*G06F 21/64*    (2013.01)

(52) U.S. Cl.
CPC ............... *H04L 51/12* (2013.01); *G06F 21/64* (2013.01); *H04L 51/00* (2013.01); *H04L 63/126* (2013.01)

(58) Field of Classification Search
CPC ....... H04L 51/00; H04L 63/126; H04L 51/12; G06F 21/64
USPC ........................................................... 726/7
See application file for complete search history.

(56) References Cited

U.S. PATENT DOCUMENTS

| 6,895,426 | B1 | 5/2005 | Cortright et al. |
| 7,191,221 | B2 | 3/2007 | Schatz et al. |
| 2004/0199598 | A1 | 10/2004 | Kalfas |
| 2005/0066070 | A1 | 3/2005 | Klassen et al. |

(Continued)

FOREIGN PATENT DOCUMENTS

| EP | 1952301 A2 | 8/2008 |
| WO | 2005059688 A3 | 3/2006 |

(Continued)

OTHER PUBLICATIONS

EPO: "Mitteilung des Europäischen Patentamts vom. Oct. 1, 2007 äber Geschäftsmethoden = Notice from the European Patent Office dated Oct. 1, 2007 concerning business methods = Communiqué de l' Office europeén des brevets, en date du ler octobre 2007, concernant les méthodes dans le domaine des activités" Journal Officiel De L'Office Europeen Des Brevets. Offical Journal of the European Patent Office. Amtsblattt Des Europaeischen Patentamts, OEB, Munchen, DE, vol. 30, No. 11, Nov. 1, 2007.

*Primary Examiner* — Harunur Rashid
(74) *Attorney, Agent, or Firm* — Galvin Patent Law; Brian R. Galvin

(57) ABSTRACT

A method whereby a communication can be readily determined to be from an authorized sender or, conversely, identified as being from an imposter, wherein a digital token is created according to a set of at least two rules known to the creator and intended recipient of the communication, further wherein the digital token comprises a recognizable factor such as an image, word, or audio segment, and a system comprising means for implementing the method of the disclosure; wherein fraudulent messages may readily be identified by recognizing whether or not the digital token associated with the message complies with one or more pre-determined rules, even if the system presenting the message is unaware of the rules or even of the authentication process as a whole.

12 Claims, 7 Drawing Sheets

(56) References Cited

U.S. PATENT DOCUMENTS

| | | |
|---|---|---|
| 2005/0193345 A1 | 9/2005 | Klassen et al. |
| 2006/0031324 A1 | 2/2006 | Chen et al. |
| 2007/0162394 A1 | 7/2007 | Zager et al. |
| 2007/0282956 A1 | 12/2007 | Staats |
| 2008/0021966 A1 | 1/2008 | Asami |
| 2008/0256107 A1 | 10/2008 | Banga et al. |
| 2009/0144554 A1 | 6/2009 | Baker |
| 2010/0115594 A1* | 5/2010 | Paya et al. .......................... 726/5 |
| 2011/0051909 A1* | 3/2011 | Frederick ................... 379/88.19 |
| 2011/0162078 A1* | 6/2011 | Taveau et al. ................... 726/26 |
| 2011/0173273 A1* | 7/2011 | Krachtus ....................... 709/206 |
| 2011/0258700 A1* | 10/2011 | Chow et al. ..................... 726/22 |

FOREIGN PATENT DOCUMENTS

| | | |
|---|---|---|
| WO | 2009038657 A2 | 3/2009 |
| WO | 2007044619 A2 | 4/2009 |

\* cited by examiner

SYSTEM AND METHOD FOR AUTHENTICATION OF COMMUNICATIONS

CROSS-REFERENCE TO RELATED APPLICATIONS

This application claims the benefit of, and priority to, GB1219235.7, titled "System and method for the authentication of communications", and filed on Oct. 25, 2012, the entire specification of which is incorporated herein by reference.

BACKGROUND OF THE INVENTION

1. Field of the Art

The disclosure relates to the field of electronic communications, and more particularly to the field of authenticating a source of electronic communications.

2. Discussion of the State of the Art

Although Email, text messaging and other forms of communication are incredibly useful, they are also susceptible to a form of fraud known as "phishing". This entails sending messages that appear to be sent by a trusted source (such as one's bank) but are actually sent by criminals and which typically instruct the recipient to divulge their security credentials thereby gaining access to their account. The problem is so widespread that it makes E-mail, in particular, almost unusable by genuine businesses—which are then forced to communicate with their customers through other, more cumbersome channels—such as when the customer logs in to their online account.

Historically, a high proportion of phishing emails have been easy to identify because of poor grammar or spelling—as they are often written by those for whom the language of the email is not their mother tongue. However, phishers are aware of this and the level of sophistication, including the standard of grammar used and the accuracy with which they mimic genuine emails, is increasing.

Existing techniques used to distinguish between genuine communications and phishing attacks include: checking that the source of the email is an authorized sender for the visible address from which it purports to originate; including customer specific information that would not be available to a phisher, such as the customer's full name or some digits from the customer's account number; including a phrase or picture known only to the customer and the (legitimate) sender. The latter approach relies on the recipient noticing that the phrase or picture is wrong or missing. This approach and the preceding one (customer specific information) are easily overcome should the phisher be able to access a legitimate message even once. Whether this is done by intercepting the message (as occurs in a "man in the middle" attack) or simply seeing the message displayed over the recipient's shoulder, it is then straightforward to incorporate the information gleaned into a subsequent message. Once this message or image is included, the presence of such apparently genuine cues can blind the recipient to the other clues—such as poor grammar—that it is fraudulent.

It would therefore be beneficial if methods existed whereby interaction between parties could be more reliably identified as genuine versus fake, ideally by the recipient simply looking at what has been received and being able to see at once the difference between a genuine message and a forgery. A similar problem has been addressed for thousands of years—in the production of coins and, later, banknotes.

Humans are quite good at identifying fake currency. Repeated exposure to the same, consistent features makes us very aware of all but the highest quality forgeries—without even having to think about some of the features. We not only look at a banknote, we also feel it. We examine the quality, thickness and cut of the paper; the precision and alignment of the printing and cutting; the fine detail within the imagery; the watermarks; the embedded foil or plastic elements. Other features typically become visible with the aid of tools such as an ultra-violet lamp or by checking serial numbers. While some of the features are harder to forge than others, the sheer number of factors, all of which must rendered to a challenging "hygiene" level is enough to deter all but the most sophisticated of forgers. In many cases, we have not been explicitly "taught" what to look for, rather we have become accustomed to the genuine article and automatically baulk at a forgery—even if we cannot put our finger on exactly what is wrong with it.

Similarly, works of art are analysed in great detail to determine—albeit not always correctly—whether or not they were produced by a particular artist. The subject matter, the technique, the brush-strokes, the color palette, the materials used, the frame and the signature are all taken into account in separating a masterpiece from a forgery.

More recently, computer protocols have been developed to ensure that communications between computers are reliable, tamper-proof and secure. Simple protocols such as TCP/IP include sequence numbers and acknowledgment mechanisms to ensure that every character is transmitted reliably, once and once only, in sequence from one end of the channel to the other. Encryption protocols are typically layered on top of this to secure the interaction. These typically rely on a "shared secret" that is known only to the authorized participants in the communication. While such techniques are easy for a computer to apply, they are very difficult for a human to use—and, to the general public, are a mystery. The average user of a website has no idea just how difficult it would be to fool his computer into showing the green bar used in many browsers to indicate a valid security certificate for an HTTPS site.

A separate but related problem with similar challenges is how to distinguish humans from computers—for example, in detecting and blocking automated attacks on websites. A common approach here is the use of CAPTCHA ("Completely Automated Public Turing test to tell Computers and Humans Apart") images. These contain text that is (just about) readable by a human but made deliberately difficult for a computer to interpret—by using differing fonts, colors, distortion, rotation, positioning, background imagery and so forth.

There is therefore a requirement to let a human spot a fake message as intuitively and reliably as spotting a fake banknote whilst at the same time making it as difficult as possible for either a human or a computer to create a credible forgery—even if they have gained access to one or more previously sent, genuine messages.

A secondary challenge is making it easy to realise that a message has been missed from, inserted into or duplicated within a sequence. This can happen because of an unreliable transmission channel, deliberate blocking or accidental deletion or mis-categorisation (typically as the odd message fails a "spam" check and is diverted to the wrong folder).

Unlike standard encryption and digital signature schemes, this invention allows the human recipient readily to identify fraudulent messages by recognizing whether or not the digital token associated with the message complies with one or more pre-determined rules

SUMMARY OF THE INVENTION

In a similar vein to the naming of "CAPTCHAT™" images, a piece of text, an image, snippet of sound, video or other media used to expose fraudulent messages is hereby dubbed a "GOTCHA" (based on "Got you!" and standing for "Generalized Obfuscated Test to Categorise Hacked from Authorized messages").

One or more GOTCHAs is embedded within or linked to each message sent from an authorized originator to the intended recipient. Each GOTCHA serves to authenticate the message as genuine by conforming to at least one rule known to the sending application and to the human recipient and/or an optional associated program (known as a "GOTCHA client") running on or accessible from the recipient's computer, mobile phone or other processing device.

Each valid GOTCHA is generated in accordance with at least one rule and can be confirmed to comply with the rule(s) by the human recipient and/or the GOTCHA client. As everyone's GOTCHA conforms to their own personal set of rules, a bulk phishing email with a single fake or copied GOTCHA cannot hope to fool many of its recipients.

GOTCHAs differ from existing "comfort messages" or pre-selected images inasmuch as they are normally dynamic rather than fixed. Thus, intercepting a message containing a GOTCHA and repeating that same GOTCHA in a subsequent message will be unlikely to fool the recipient.

According to one aspect of the invention, there is provided a method for authenticating a message by associating one or more digital tokens with the message wherein tokens are constructed according to a set of at least two rules known to the creator of the tokens to confirm the authenticity of the message and where compliance with at least one of the rules is readily recognisable by the intended human recipient even when the token is rendered without knowledge of or reference to the rules. The rules may be agreed or negotiated with the recipient.

At least one digital token may consist of an ordered set of characters. At least one digital token may include at least one of a graphical image, an audio signal, a moving image, one or more movements or haptic gestures. At least one of the digital tokens may represent one or more odors. At least one of the digital tokens may describe and/or provide means of responding to one or more user interactions.

The rules may include spatial and/or temporal location of at least one digital token within the message.

The rules may include any of the order, number, sequence of characters, case of characters, presence or absence of whitespace or punctuation characters or relationships between characters.

The rules may relate to any of: the presence of, absence of, length of or order of valid words, anagrams, interleaved words, specific words or categories of words within the character sequence.

The rules may relate to the size, shape, resolution, aspect ratio, color, pattern, texture, border, or translucency, of the image.

The rules may relate to any of: the presence of, absence of, number of, orientation of, size of, color of, resolution of or sequence of specific or generic sub-image or sub-images.

The rules may relate to the representation of text within the image. For example, the rules may relate to the characters within, the words within, the position of, the color of, the orientation of, the font of, the style of or the size of the text within the image.

The image may contain one or more obfuscated digital tokens. The obfuscated digital token may take the form of a secondary image. The obfuscated image may be described in the least significant bits of the color values of some or all pixels. The obfuscated image may be hidden by shifting concentric squares of pixels about an origin by pre-determined numbers of pixels.

The rules may relate to any of: the letters spoken, the words spoken, the background noise or noises, the way in which utterances are made, the order in which utterances are made; the speaker's gender, age or accent, the tune or notes playing; the relationship between utterances or other prosodic attributes.

The rules may relate to any of: the absolute, relative or sequential motion of objects, the presence, absence or concurrence of elements within the moving image or the relationship between audio and visual events.

The rules may relate an attribute of one type of the digital token to an attribute of a different type of digital token. For example, the rules may define a relationship between a sound and an action in a moving image.

The rules may relate to a sequence of actions and/or consequences of the actions.

At least one digital token may incorporate a number or representation of a number that changes from one message to the next. The number or representation of a number may indicate the sequence number of the message within a specified set of messages. The set of messages may be all messages sent across all authorized senders to the recipient. The set of messages may be all messages sent from a specific sender to the recipient.

The digital tokens may be constructed in parts and combined together to form the overall digital token. Each part may be constructed by a system having knowledge of only a subset of the overall set of the rules known to the recipient.

The rules outside the proper subset of rules checked for by the recipient may be consistently applied to all such digital tokens. Some of the rules outside the proper subset of rules checked for by the recipient may be changed from the generation of one digital token to the next.

Digital tokens within successive messages may be combined to build a larger digital token. The digital tokens may combine in the form of a jigsaw. The larger digital token may be any of: a story, puzzle or trivia fact, a series of cartoon frames, a larger image, a voucher or token, a bar-code or Quick Response Code.

Automated checks may be made of one or more aspects of the said digital tokens. The automated checks may include confirmation of precise alignment of transparent areas between abutting images. Representation of a number may be super-imposed over an image. The image may be associated with the sender of said message.

The digital token may incorporate some element of the previous message sent from the same originator. The element may be partially obfuscated.

The method may involve asking the recipient to distinguish between valid and invalid tokens generated according to a putative set of rules prior to the fixing of said rules.

At least one of the rules outside said proper subset of rules checked for by the recipient may be subsequently explicitly revealed to said recipient.

The image may be divided into a plurality of substantially constant areas such that in successive messages each such area is populated by a specific application. One of the areas may be always populated according to the same set of rules, regardless of the originator of the message. One of the areas may be populated according to a set of rules that is specific to the originator of the message. The boundary between the areas may vary from one message to the next whilst retaining the general shape and size of each area. The boundary between the areas may be determined by one or other of the parties responsible for populating said areas and communicated to the other party or parties. The precise alignment and/or overlap of transparent areas may be checked automatically.

Digital tokens sent in successive messages may be deliberately different from each other in at least a predetermined number of respects.

The digital tokens may conform to industry standard file formats. For example, file format may be at least one of: PNG, GIF, JPG, MPG, WAV, MP3, CSV, PDF file formats.

The digital tokens may be in a dedicated file format. The dedicated file format may be associated with and hence trigger an associated application or program for rendering and analysing the digital token.

According to another aspect of the invention, there is provided a method for authenticating a message by associating at least one digital token with the message, wherein the at least one digital token is created according to a set of at least two rules known to the creator and the intended human recipient of the token to confirm the authenticity of the message, and at least one rule unknown to or unused by the intended human recipient, wherein compliance with the recipient rules is readily recognisable by the intended human recipient.

By applying rules to the digital token to generate features that the intended recipient is not looking for, identifying the recipient rules is made more difficult. This reduces the likelihood that a phisher will be able to work out the recipient rules for correctly generating fake or fraudulent tokens.

The unknown or unused rules applied may be changed from generation of one digital token to the next.

At least one of the digital tokens has a graphical image and/or a set of characters and/or an audio signal and/or a moving image and/or is representative of one or more movements or haptic gestures and/or one or more odors.

At least one of the digital tokens describes and/or provides means of responding to one or more user interactions.

The rules may include the spatial and/or temporal location of the said digital tokens within said message.

The rules may relate to at least one of the size, shape, resolution, aspect ratio, color, pattern, texture, border, translucency of said image; presence of, absence of, number of, orientation of, size of, color of, resolution of or sequence of specific or generic sub-image or sub-images, representation of text within said image, wherein for text the rules relate to the characters within, the words within, the position of, the color of, the orientation of, the font of, the style of or the size of said text within said image.

At least one of the digital tokens may be partially or fully obfuscated.

The at least one digital token may comprise: a plurality of characters, and the rules include at least one of: the order, number, sequence of characters, case of characters, presence or absence of whitespace or punctuation characters or relationships between characters, the presence of, absence of, length of or order of valid words, anagrams, interleaved words, specific words or categories of words within said character sequence, and/or an audio signal, and the rules relate to at least one of: letters spoken, words spoken, background noise or noises, a way in which utterances are made, an order in which utterances are made, a gender of the speaker, age or accent, a tune or notes playing, a relationship between utterances or other prosodic attributes, and/or a moving image, and the rules relate to at least one of: the absolute, relative or sequential motion of objects, the presence, absence or concurrence of elements within the moving image or the relationship between audio and visual events.

The rules may relate an attribute of one type of digital token to an attribute of a different type of digital token.

At least one digital token may incorporates a number or representation of a number that changes from one message to the next, for example the number or representation of a number indicates a sequence number of the message within a set of messages sent from all authorized senders or from a subset of authorized senders or from a specific sender.

Digital tokens within successive messages are combined to build a larger digital token, for example the larger digital token being any of: a jigsaw, a story, puzzle or trivia fact, a series of cartoon frames, a larger image, a voucher or token, a bar-code or Quick Response Code. The digital token may incorporate an element of the previous message sent from the same originator.

The graphical image may be divided into a plurality of substantially constant areas such that in successive messages each such area is populated by a specific application, wherein at least one of the areas is always populated according to the same set of rules, regardless of the originator of the message and/or a set of rules that is specific to the originator of the message and/or the precise boundary between said areas varies from one message to the next whilst retaining the general shape and size of each area.

Digital tokens sent in successive messages may be different from each other.

According to yet another aspect of the invention, there is provided a method for authenticating a message by associating at least one digital token with the message, wherein the at least one digital token is created according to a set of at least two rules known to the creator and the intended human recipient of the token to confirm the authenticity of the message, wherein a wherein at least one digital token incorporates a number or representation of a number that changes from one message to the next, wherein compliance with the recipient rules is readily recognisable by the intended human recipient. Preferably, the number or representation of the number indicates a sequence number of the message within a set of messages sent from all authorized senders or from a subset of authorized senders or from a specific sender.

According to yet another aspect of the invention, there is provided a method for selecting rules for generating a digital token that can be used to authenticate a message, the method involving presenting a plurality of rules for creating a digital token to a user; receiving a user selection of two or more rules; generating valid digital tokens according to the selected rules and generating invalid digital tokens; presenting the valid and invalid tokens to the user; determining user recognition of the valid digital token. In the event that the user is unable to distinguish between valid and invalid tokens, the rule selection process may be repeated to try to improve user recognition. Preferably, the method is computer processor implemented, and the rules are presented on a display.

BRIEF DESCRIPTION OF THE DRAWING FIGURES

The accompanying drawings illustrate several embodiments of the invention and, together with the description, serve to explain the principles of the invention according to the embodiments. One skilled in the art will recognize that the particular embodiments illustrated in the drawings are merely exemplary, and are not intended to limit the scope of the present invention.

DETAILED DESCRIPTION

Figure 1:
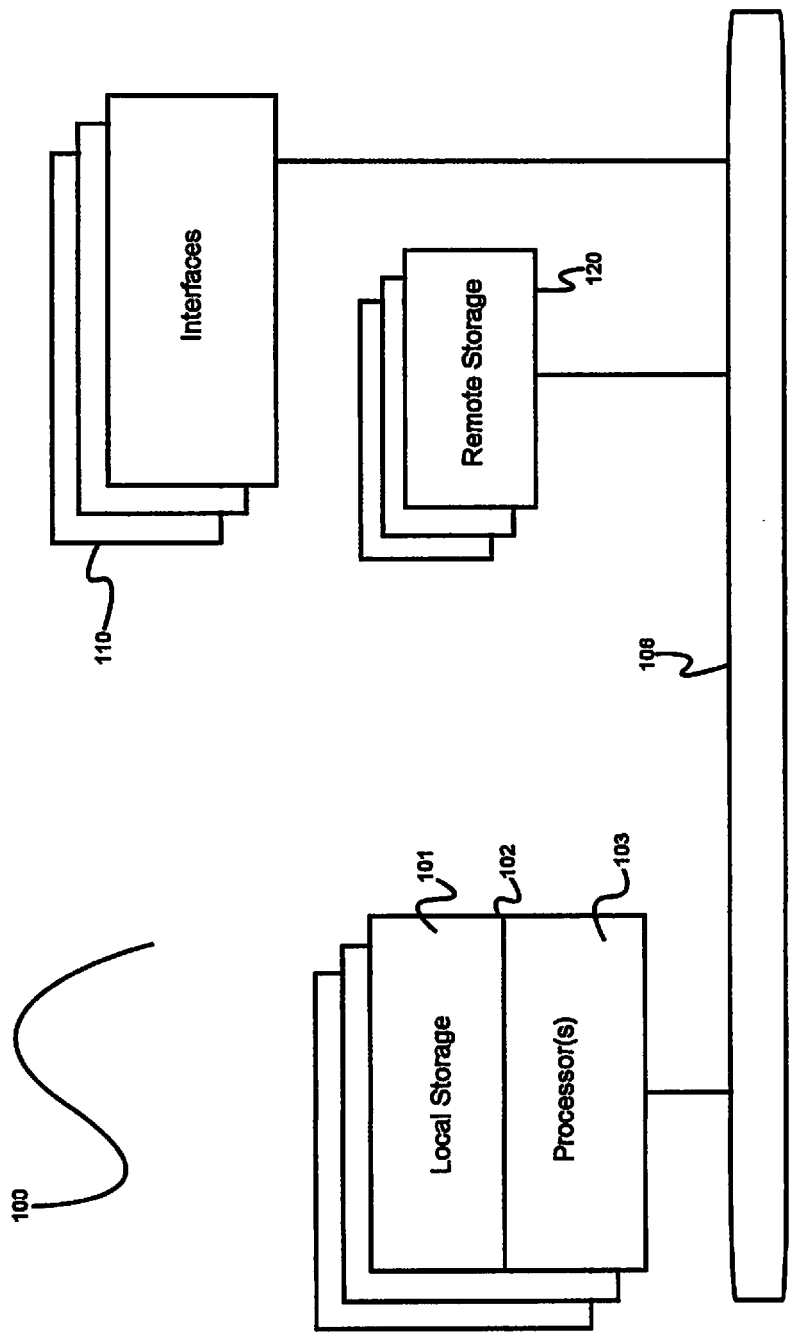
FIG. 1 is a block diagram illustrating an exemplary hardware architecture of a computing device used in an embodiment of the invention.

The inventor has conceived, and reduced to practice, a system and method for authentication of electronic communications.

One or more different inventions may be described in the present application. Further, for one or more of the inventions described herein, numerous alternative embodiments may be described; it should be understood that these are presented for illustrative purposes only. The described embodiments are not intended to be limiting in any sense. One or more of the inventions may be widely applicable to numerous embodiments, as is readily apparent from the disclosure. In general, embodiments are described in sufficient detail to enable those skilled in the art to practice one or more of the inventions, and it is to be understood that other embodiments may be utilized and that structural, logical, software, electrical and other changes may be made without departing from the scope of the particular inventions. Accordingly, those skilled in the art will recognize that one or more of the inventions may be practiced with various modifications and alterations. Particular features of one or more of the inventions may be described with reference to one or more particular embodiments or figures that form a part of the present disclosure, and in which are shown, by way of illustration, specific embodiments of one or more of the inventions. It should be understood, however, that such features are not limited to usage in the one or more particular embodiments or figures with reference to which they are described. The present disclosure is neither a literal description of all embodiments of one or more of the inventions nor a listing of features of one or more of the inventions that must be present in all embodiments.

Headings of sections provided in this patent application and the title of this patent application are for convenience only, and are not to be taken as limiting the disclosure in any way.

Devices that are in communication with each other need not be in continuous communication with each other, unless expressly specified otherwise. In addition, devices that are in communication with each other may communicate directly or indirectly through one or more intermediaries, logical or physical.

A description of an embodiment with several components in communication with each other does not imply that all such components are required. To the contrary, a variety of optional components may be described to illustrate a wide variety of possible embodiments of one or more of the inventions and in order to more fully illustrate one or more aspects of the inventions. Similarly, although process steps, method steps, algorithms or the like may be described in a sequential order, such processes, methods and algorithms may generally be configured to work in alternate orders, unless specifically stated to the contrary. In other words, any sequence or order of steps that may be described in this patent application does not, in and of itself, indicate a requirement that the steps be performed in that order. The steps of described processes may be performed in any order practical. Further, some steps may be performed simultaneously despite being described or implied as occurring non-simultaneously (e.g., because one step is described after the other step). Moreover, the illustration of a process by its depiction in a drawing does not imply that the illustrated process is exclusive of other variations and modifications thereto, does not imply that the illustrated process or any of its steps are necessary to one or more of the invention(s), and does not imply that the illustrated process is preferred. Also, steps are generally described once per embodiment, but this does not mean they must occur once, or that they may only occur once each time a process, method, or algorithm is carried out or executed. Some steps may be omitted in some embodiments or some occurrences, or some steps may be executed more than once in a given embodiment or occurrence.

When a single device or article is described, it will be readily apparent that more than one device or article may be used in place of a single device or article. Similarly, where more than one device or article is described, it will be readily apparent that a single device or article may be used in place of the more than one device or article.

The functionality or the features of a device may be alternatively embodied by one or more other devices that are not explicitly described as having such functionality or features. Thus, other embodiments of one or more of the inventions need not include the device itself.

Techniques and mechanisms described or referenced herein will sometimes be described in singular form for clarity. However, it should be noted that particular embodiments include multiple iterations of a technique or multiple instantiations of a mechanism unless noted otherwise. Process descriptions or blocks in figures should be understood as representing modules, segments, or portions of code which include one or more executable instructions for implementing specific logical functions or steps in the process. Alternate implementations are included within the scope of embodiments of the present invention in which, for example, functions may be executed out of order from that shown or discussed, including substantially concurrently or in reverse order, depending on the functionality involved, as would be understood by those having ordinary skill in the art.

Hardware Architecture

Generally, the techniques disclosed herein may be implemented on hardware or a combination of software and hardware. For example, they may be implemented in an operating system kernel, in a separate user process, in a library package bound into network applications, on a specially constructed machine, on an application-specific integrated circuit (ASIC), or on a network interface card.

Software/hardware hybrid implementations of at least some of the embodiments disclosed herein may be implemented on a programmable network-resident machine (which should be understood to include intermittently connected network-aware machines) selectively activated or reconfigured by a computer program stored in memory. Such network devices may have multiple network interfaces that may be configured or designed to utilize different types of network communication protocols. A general architecture for some of these machines may be disclosed herein in order to illustrate one or more exemplary means by which a given unit of functionality may be implemented. According to specific embodiments, at least some of the features or functionalities of the various embodiments disclosed herein may be implemented on one or more general-purpose computers associated with one or more networks, such as for example an end-user computer system, a client computer, a network server or other server system, a mobile computing device (e.g., tablet computing device, mobile phone, smartphone, laptop, and the like), a consumer electronic device, a music player, or any other suitable electronic device, router, switch, or the like, or any combination thereof. In at least some embodiments, at least some of the features or functionalities of the various embodiments disclosed herein may be implemented in one or more virtualized computing environments (e.g., network computing clouds, virtual machines hosted on one or more physical computing machines, or the like).

Referring now to FIG. 1, there is shown a block diagram depicting an exemplary computing device 100 suitable for implementing at least a portion of the features or functionalities disclosed herein. Computing device 100 may be, for example, any one of the computing machines listed in the previous paragraph, or indeed any other electronic device capable of executing software- or hardware-based instructions according to one or more programs stored in memory. Computing device 100 may be adapted to communicate with a plurality of other computing devices, such as clients or servers, over communications networks such as a wide area network a metropolitan area network, a local area network, a wireless network, the Internet, or any other network, using known protocols for such communication, whether wireless or wired.

In one embodiment, computing device 100 includes one or more central processing units (CPU) 102, one or more interfaces 110, and one or more busses 106 (such as a peripheral component interconnect (PCI) bus). When acting under the control of appropriate software or firmware, CPU 102 may be responsible for implementing specific functions associated with the functions of a specifically configured computing device or machine. For example, in at least one embodiment, a computing device 100 may be configured or designed to function as a server system utilizing CPU 102, local memory 101 and/or remote memory 120, and interface(s) 110. In at least one embodiment, CPU 102 may be caused to perform one or more of the different types of functions and/or operations under the control of software modules or components, which for example, may include an operating system and any appropriate applications software, drivers, and the like.

CPU 102 may include one or more processors 103 such as, for example, a processor from one of the Intel, ARM, Qualcomm, and AMD families of microprocessors. In some embodiments, processors 103 may include specially designed hardware such as application-specific integrated circuits (ASICs), electrically erasable programmable read-only memories (EEPROMs), field-programmable gate arrays (FPGAs), and so forth, for controlling operations of computing device 100. In a specific embodiment, a local memory 101 (such as non-volatile random access memory (RAM) and/or read-only memory (ROM), including for example one or more levels of cached memory) may also form part of CPU 102. However, there are many different ways in which memory may be coupled to system 100. Memory 101 may be used for a variety of purposes such as, for example, caching and/or storing data, programming instructions, and the like.

As used herein, the term "processor" is not limited merely to those integrated circuits referred to in the art as a processor, a mobile processor, or a microprocessor, but broadly refers to a microcontroller, a microcomputer, a programmable logic controller, an application-specific integrated circuit, and any other programmable circuit.

In one embodiment, interfaces 110 are provided as network interface cards (NICs). Generally, NICs control the sending and receiving of data packets over a computer network; other types of interfaces 110 may for example support other peripherals used with computing device 100. Among the interfaces that may be provided are Ethernet interfaces, frame relay interfaces, cable interfaces, DSL interfaces, token ring interfaces, graphics interfaces, and the like. In addition, various types of interfaces may be provided such as, for example, universal serial bus (USB), Serial, Ethernet, Firewire™, PCI, parallel, radio frequency (RF), Bluetooth™, near-field communications (e.g., using near-field magnetics), 802.11 (WiFi), frame relay, TCP/IP, ISDN, fast Ethernet interfaces, Gigabit Ethernet interfaces, asynchronous transfer mode (ATM) interfaces, high-speed serial interface (HSSI) interfaces, Point of Sale (POS) interfaces, fiber data distributed interfaces (FDDIs), and the like. Generally, such interfaces 110 may include ports appropriate for communication with appropriate media. In some cases, they may also include an independent processor and, in some instances, volatile and/or non-volatile memory (e.g., RAM).

Although the system shown in FIG. 1 illustrates one specific architecture for a computing device 100 for implementing one or more of the inventions described herein, it is by no means the only device architecture on which at least a portion of the features and techniques described herein may be implemented. For example, architectures having one or any number of processors 103 may be used, and such processors 103 may be present in a single device or distributed among any number of devices. In one embodiment, a single processor 103 handles communications as well as routing computations, while in other embodiments a separate dedicated communications processor may be provided. In various embodiments, different types of features or functionalities may be implemented in a system according to the invention that includes a client device (such as a tablet device or smartphone running client software) and server systems (such as a server system described in more detail below).

Regardless of network device configuration, the system of the present invention may employ one or more memories or memory modules (such as, for example, remote memory block 120 and local memory 101) configured to store data, program instructions for the general-purpose network operations, or other information relating to the functionality of the embodiments described herein (or any combinations of the above). Program instructions may control execution of or comprise an operating system and/or one or more applications, for example. Memory 120 or memories 101, 120 may also be configured to store data structures, configuration data, encryption data, historical system operations information, or any other specific or generic non-program information described herein.

Because such information and program instructions may be employed to implement one or more systems or methods described herein, at least some network device embodiments may include nontransitory machine-readable storage media, which, for example, may be configured or designed to store program instructions, state information, and the like for performing various operations described herein. Examples of such nontransitory machine-readable storage media include, but are not limited to, magnetic media such as hard disks, floppy disks, and magnetic tape; optical media such as CD-ROM disks; magneto-optical media such as optical disks, and hardware devices that are specially configured to store and perform program instructions, such as read-only memory devices (ROM), flash memory, solid state drives, memristor memory, random access memory (RAM), and the like. Examples of program instructions include both object code, such as may be produced by a compiler, machine code, such as may be produced by an assembler or a linker, byte code, such as may be generated by for example a Java™ compiler and may be executed using a Java virtual machine or equivalent, or files containing higher level code that may be executed by the computer using an interpreter (for example, scripts written in Python, Perl, Ruby, Groovy, or any other scripting language).

Figure 2:
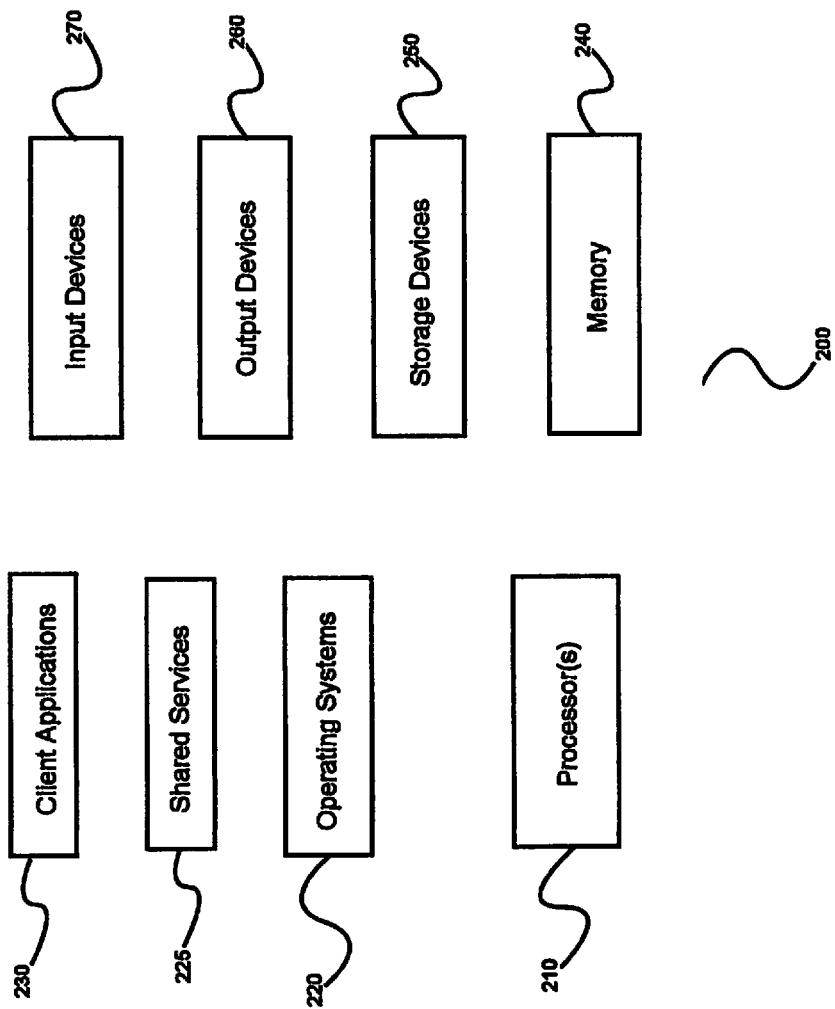
FIG. 2 is a block diagram illustrating an exemplary logical architecture for a client device, according to an embodiment of the invention.

In some embodiments, systems according to the present invention may be implemented on a standalone computing system. Referring now to FIG. 2, there is shown a block diagram depicting a typical exemplary architecture of one or more embodiments or components thereof on a standalone computing system. Computing device 200 includes processors 210 that may run software that carry out one or more functions or applications of embodiments of the invention, such as for example a client application 230. Processors 210 may carry out computing instructions under control of an operating system 220 such as, for example, a version of Microsoft's Windows™ operating system, Apple's Mac OS/X or iOS operating systems, some variety of the Linux operating system, Google's Android™ operating system, or the like. In many cases, one or more shared services 225 may be operable in system 200, and may be useful for providing common services to client applications 230. Services 225 may for example be Windows™ services, user-space common services in a Linux environment, or any other type of common service architecture used with operating system 210. Input devices 270 may be of any type suitable for receiving user input, including for example a keyboard, touchscreen, microphone (for example, for voice input), mouse, touchpad, trackball, or any combination thereof. Output devices 260 may be of any type suitable for providing output to one or more users, whether remote or local to system 200, and may include for example one or more screens for visual output, speakers, printers, or any combination thereof. Memory 240 may be random-access memory having any structure and architecture known in the art, for use by processors 210, for example to run software. Storage devices 250 may be any magnetic, optical, mechanical, memristor, or electrical storage device for storage of data in digital form. Examples of storage devices 250 include flash memory, magnetic hard drive, CD-ROM, and/or the like.

Figure 3:
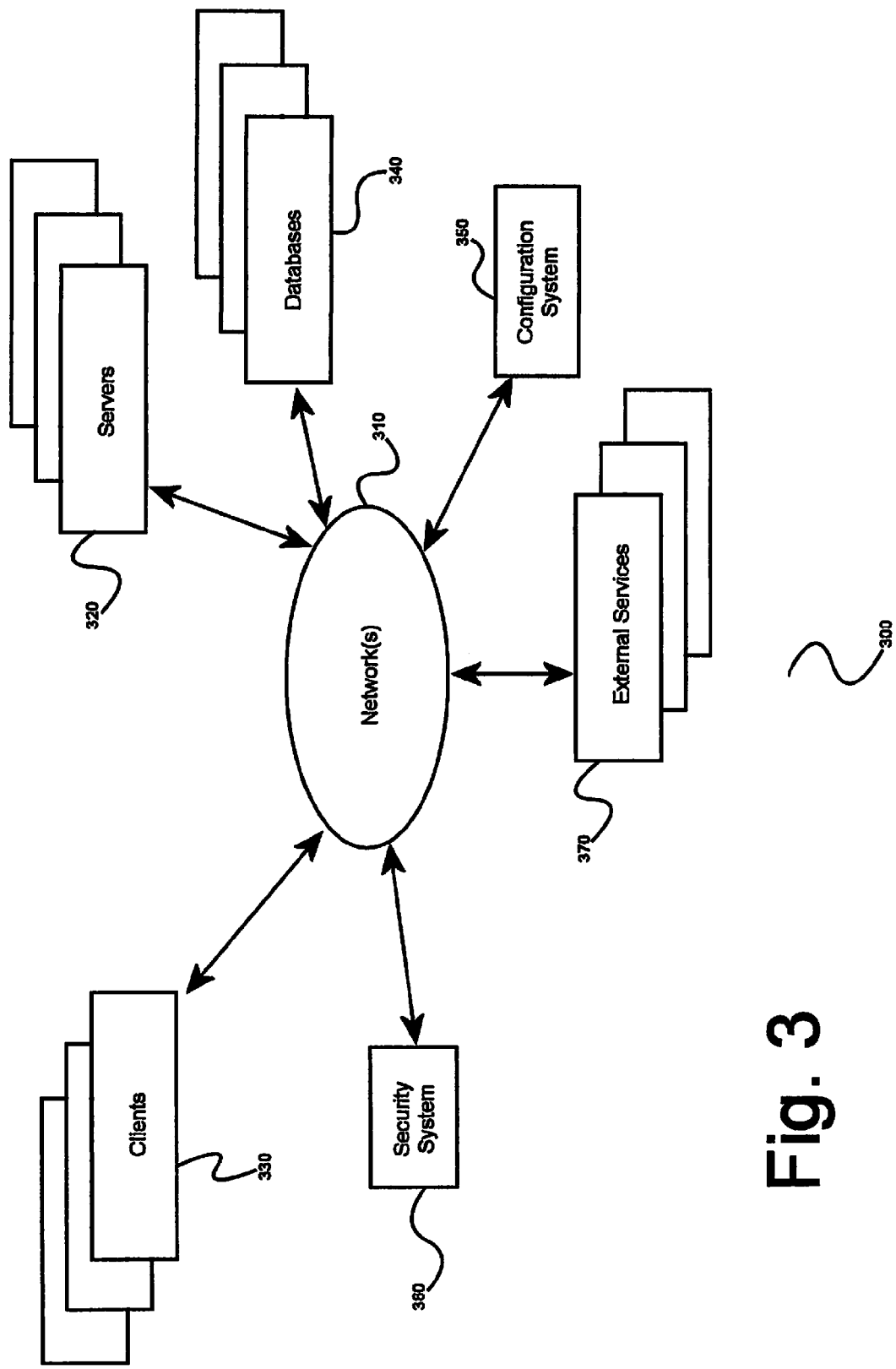
FIG. 3 is a block diagram showing an exemplary architectural arrangement of clients, servers, and external services, according to an embodiment of the invention.

In some embodiments, systems of the present invention may be implemented on a distributed computing network, such as one having any number of clients and/or servers. Referring now to FIG. 3, there is shown a block diagram depicting an exemplary architecture for implementing at least a portion of a system according to an embodiment of the invention on a distributed computing network. According to the embodiment, any number of clients 330 may be provided. Each client 330 may run software for implementing client-side portions of the present invention; clients may comprise a system 200 such as that illustrated in FIG. 2. In addition, any number of servers 320 may be provided for handling requests received from one or more clients 330. Clients 330 and servers 320 may communicate with one another via one or more electronic networks 310, which may be in various embodiments any of the Internet, a wide area network, a mobile telephony network, a wireless network (such as WiFi, Wimax, and so forth), or a local area network (or indeed any network topology known in the art; the invention does not prefer any one network topology over any other). Networks 310 may be implemented using any known network protocols, including for example wired and/or wireless protocols.

In addition, in some embodiments, servers 320 may call external services 370 when needed to obtain additional information, or to refer to additional data concerning a particular call. Communications with external services 370 may take place, for example, via one or more networks 310. In various embodiments, external services 370 may comprise web-enabled services or functionality related to or installed on the hardware device itself. For example, in an embodiment where client applications 230 are implemented on a smartphone or other electronic device, client applications 230 may obtain information stored in a server system 320 in the cloud or on an external service 370 deployed on one or more of a particular enterprise's or user's premises.

In some embodiments of the invention, clients 330 or servers 320 (or both) may make use of one or more specialized services or appliances that may be deployed locally or remotely across one or more networks 310. For example, one or more databases 340 may be used or referred to by one or more embodiments of the invention. It should be understood by one having ordinary skill in the art that databases 340 may be arranged in a wide variety of architectures and using a wide variety of data access and manipulation means. For example, in various embodiments one or more databases 340 may comprise a relational database system using a structured query language (SQL), while others may comprise an alternative data storage technology such as those referred to in the art as "NoSQL" (for example, Hadoop Cassandra, Google BigTable, and so forth). In some embodiments, variant database architectures such as column-oriented databases, in-memory databases, clustered databases, distributed databases, or even flat file data repositories may be used according to the invention. It will be appreciated by one having ordinary skill in the art that any combination of known or future database technologies may be used as appropriate, unless a specific database technology or a specific arrangement of components is specified for a particular embodiment herein. Moreover, it should be appreciated that the term "database" as used herein may refer to a physical database machine, a cluster of machines acting as a single database system, or a logical database within an overall database management system. Unless a specific meaning is specified for a given use of the term "database", it should be construed to mean any of these senses of the word, all of which are understood as a plain meaning of the term "database" by those having ordinary skill in the art.

Similarly, most embodiments of the invention may make use of one or more security systems 360 and configuration systems 350. Security and configuration management are common information technology (IT) and web functions, and some amount of each are generally associated with any IT or web systems. It should be understood by one having ordinary skill in the art that any configuration or security subsystems known in the art now or in the future may be used in conjunction with embodiments of the invention without limitation, unless a specific security 360 or configuration system 350 or approach is specifically required by the description of any specific embodiment.

Figure 4:
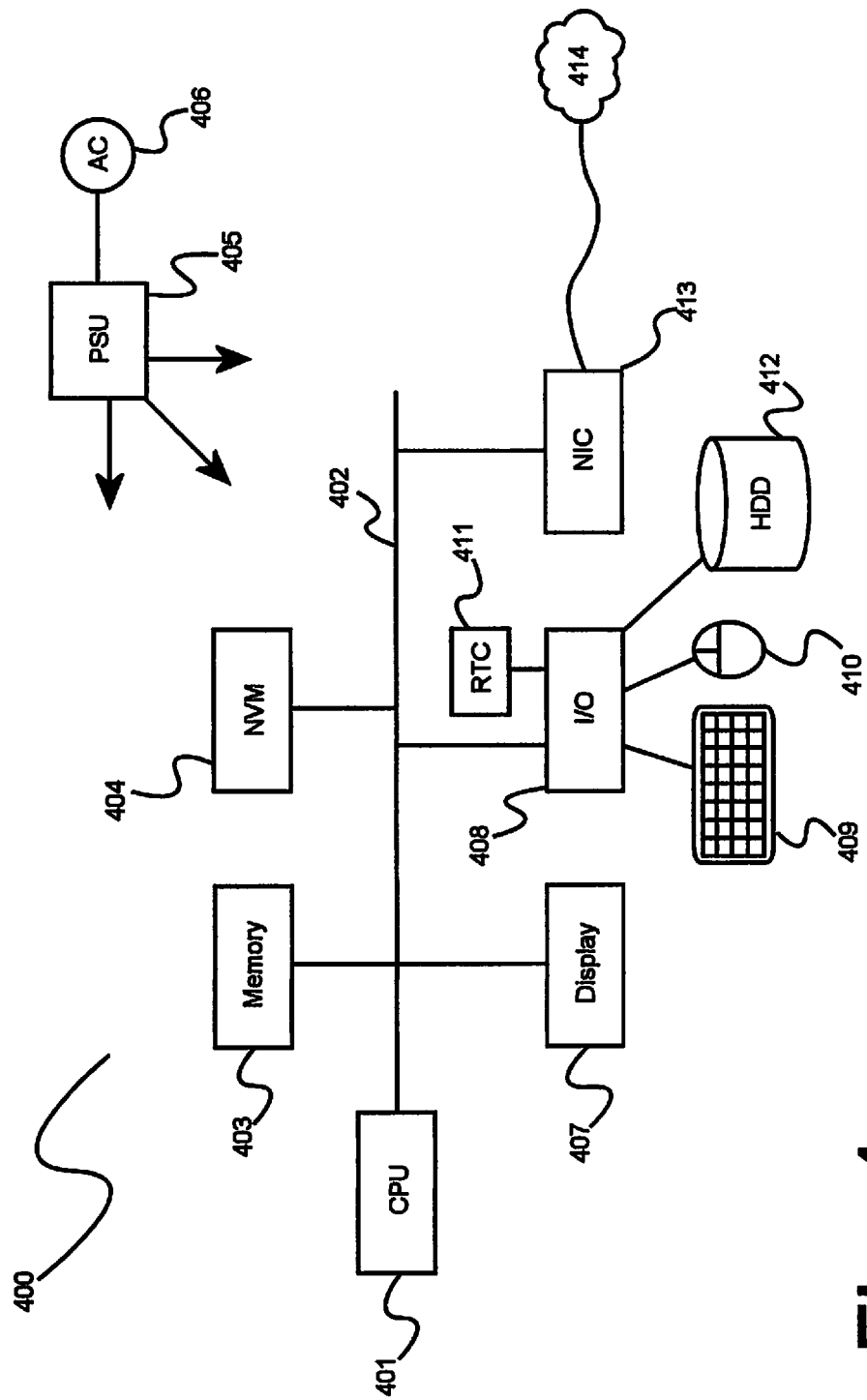
FIG. 4 is another block diagram illustrating an exemplary hardware architecture of a computing device used in various embodiments of the invention.

FIG. 4 shows an exemplary overview of a computer system 800 as may be used in any of the various locations throughout the system. It is exemplary of any computer that may execute code to process data. Various modifications and changes may be made to computer system 800 without departing from the broader spirit and scope of the system and method disclosed herein. CPU 401 is connected to bus 402, to which bus is also connected memory 403, nonvolatile memory 404, display 407, I/O unit 408, and network interface card (NIC) 413. I/O unit 408 may, typically, be connected to keyboard 409, pointing device 410, hard disk 412, and real-time clock 411. NIC 413 connects to network 414, which may be the Internet or a local network, which local network may or may not have connections to the Internet. Also shown as part of system 400 is power supply unit 405 connected, in this example, to ac supply 406. Not shown are batteries that could be present, and many other devices and modifications that are well known but are not applicable to the specific novel functions of the current system and method disclosed herein.

In various embodiments, functionality for implementing systems or methods of the present invention may be distributed among any number of client and/or server components. For example, various software modules may be implemented for performing various functions in connection with the present invention, and such modules may be variously implemented to run on server and/or client components.

DETAILED DESCRIPTION OF EXEMPLARY EMBODIMENTS

The invention provides various methods and systems for authenticating messages between a sender and an intended recipient using a digital token. The methods are computer processor implemented. Typically, the digital tokens are generated and added to an electronic message for sending to a recipient electronically, for example an e-mail or SMS. Any suitable computer processor based system and any suitable computer language may be used in practice. Preferably, each digital token is stored in a computer memory, for example in a database, usually in association with the message sent.

A GOTCHA consists of one or more data items, the rendering of which may, optionally, be ordered in time and/or space. The nature of the items is limited only by the transmission characteristics of the communication channel and the devices through which the message is being viewed, played or watched. For example, SMS (Short Message Service) text messages can only support character-based GOTCHAs and, due to the severe constraints on message size, these are typically only a few words longs.

Where communication is via a purely voice path, such as a telephone call or Voicemail system then an audio GOTCHA can be used. This could be spoken characters (for example "A", "F", "T"); a few words ("AFT", "FATHOM"), individual musical notes of specific pitch duration and interval; specific noises (a dentist's drill or an Ivory Billed Woodpecker's call) or a snippet of a song.

With a web interaction, e-mail or MMS (Multimedia Messaging Service), GOTCHAs can be much more sophisticated and include text, still or moving images, audio etc.

Figure 5:
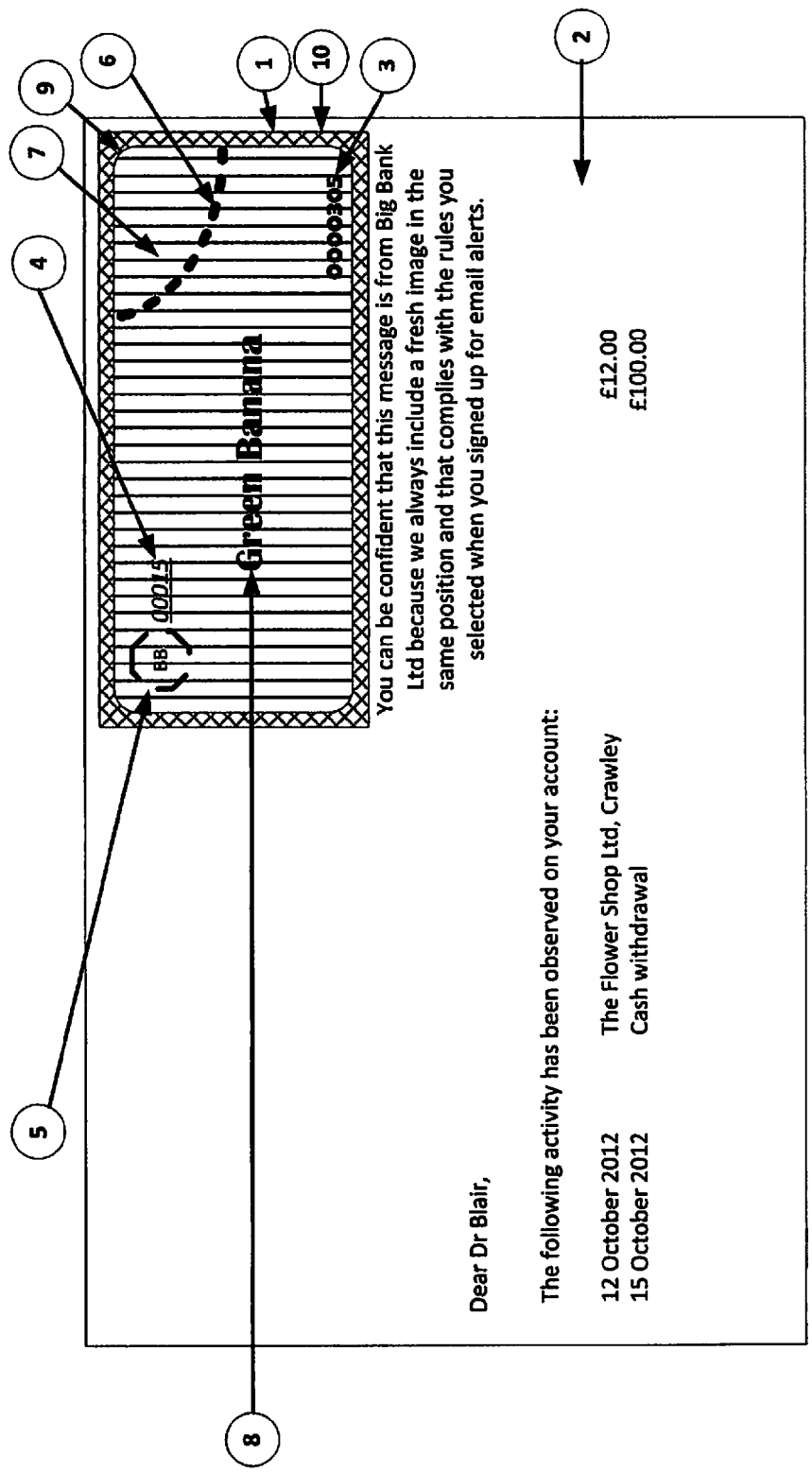
FIG. 5 is an illustration of a relatively simple GOTCHA presented within an email message.

FIG. 5 shows a relatively simple GOTCHA (1) presented as an image within an email message (2) such as might be received from one's bank.

Devices with haptic interfaces—such as mobile phones that can vibrate, Braille displays etc.—can also use specific movements, combinations of movements and sequences of such actions as a GOTCHA. Similarly, odor generators could release a specific smell or combination and/or sequence of smells as a GOTCHA.

The GOTCHAs described above can be interpreted by a human recipient reading, seeing and/or hearing them so long as that person knows the rule or rules that the GOTCHA should obey—and are therefore "Manual GOTCHAs". Although all forms of digital information must be processed into visual, audio, olfactory or haptic content, the rendering mechanism does not need to be aware of the rule in order to do so. It is the human that knows and can apply the rule to the rendered image, sound, feeling or smell.

Note also that even when printed out onto hard copy, an image or text GOTCHA continues to be interpretable by the intended recipient. Just by looking at it, the reader will have a strong sense of whether or not the GOTCHA—and hence the message it accompanies—is valid or not.

Existing digital signature, watermarking and tamper detection techniques can be considered as "Automated GOTCHAs"—as these can only be interpreted by the appropriate computer algorithm which must know and utilise the shared rule or "secret" to determine their validity.

"Hybrid GOTCHAs" are those in which the GOTCHA must first be processed by a computer algorithm that is aware of at least a part of the overall rule. For example, the least significant bit of the red color value in each pixel may form a black and white image. The rendering software has to know the watermarking technique being used in order to render that black and white image but only the human who then views that image needs to know how to tell a valid image from an invalid one.

Most practical GOTCHAs are made more secure and hence effective by being "Compound GOTCHAs". These comply with more than one rule, each of which may be a manual, automated or hybrid type as described above.

In all of these cases, the richness of the communication medium can be used to the full in defining the range of possible rules. It is not just what a GOTCHA contains but how the information is presented that matters.

For example, a manual audio GOTCHA consisting of the two words "cat" and "drainpipe" spoken over a telephone line as part of a greeting may be recognized as valid if, and only if, the first word is spoken by a female and the second word by a male. In this case the actual words are irrelevant. Alternatively, it may be that the first word is spoken in a higher pitch than the second; or that the second word is always rushed; or that there is a slight cough between the two words; or that the second word is always spoken with a French accent—and so forth.

Other audio manual GOTCHAs could follow non word based rules such as: a snippet from a specific song; a few bars played by a specific instrument or sung by a particular artiste; a particular sequence of notes (as in "Close Encounters of the Third Kind") or a snippet of a song that sounds crackly and distorted as if played from an old '78'. As humans are good at distinguishing voices from other sounds, a background noise can also form an important part of a rule. For example, hearing in the background a police siren, running water, bacon sizzling, a motor car engine or any one of thousands of other easily recognisable sounds could be a requirement.

For every type of (media, text, audio, picture, moving image, movement and so on), there is a wide range of possible rules that are straightforward for a human to interpret yet difficult for a computer to guess or to deduce even if it does gain access to one or more examples.

Where the medium only supports character based text (as in SMS) the range of rules available is reduced but still large. For example, a text GOTCHA consisting of one or two words may have to conform to a rule such as: the third letter is always "F"; the second word is always a nonsense word; the first word always has a punctuation character inserted into it; the letters "C", "A" and "T" will always be present somewhere; there will always be a single uppercase letter in the middle of a word; the first word will always be mis-spelled; the second word will always be an anagram of "fishes"; the second word will always be two letters longer than the first; the first and last letters will always be adjacent in the alphabet; two words will be interleaved such that odd numbered characters form one word and even numbered characters form a second valid word—and so forth. Note that many of these rules (but not, for example the punctuation, spelling, interleaving, whitespace and capitalization rules) can also be used where the GOTCHA is spoken or spelled out over an audio channel.

Where an image can be presented graphically, a huge range of further rules can be offered. Text-based GOTCHAs, in addition to the above rules based on the characters shown, can be enhanced using all the tricks employed in a CAPTCHA. This not only makes it harder for a computer to determine what the text within them is, it also allows graphical rules to be used in combination with text rules. For example, an image GOTCHA may be required to comply with any of the following rules: a banana somewhere in the picture; an orange corner; a stripy background; a purple "T" present; an upside down "F" present; whatever is in the bottom right corner is upside-down; something yellow in the centre—and so forth. How each character and/or word is presented can be significant and can include: which font is used; superscript or subscript; size; orientation; bold, italic, underlined, over-scored etc.; color or even color gradient (e.g. last letter always blue at the bottom changing to red at the top).

The overall "style" of the image—in particular it's shape, size, aspect ratio, resolution, sharpness of focus, translucency and so on—also lend themselves to being used as very powerful rules. Without being told, a customer who normally receives a long thin oval GOTCHA will reject a small square GOTCHA.

The GOTCHA (1) in FIG. 5 shows some basic monochrome features but it can be appreciated that a phisher would be challenged to figure out, even if he had access to this GOTCHA, whether the recipient is checking for any or all of: a dashed arc (6) in the top right; a vertically striped background (7); two words in a particular font (8); rounded corners on the inner frame (9) or a hashed outer frame (10). In fact, this user is checking for an item of food in one word, a thick dashed arc that cuts off a different corner of the image each time—not to mention appropriate global (3) and bank specific (4) sequence numbers in the fonts shown with the latter (4) in italics and underlined.

Typically only a few of the aforementioned features are the required rules—but the hacker has no way of knowing which are significant. In addition to the required rules, each GOTCHA will appear to be conforming to a large number of rules, any or all of which may be significant.

Where the communication medium supports the inclusion, attachment or linkage to moving images, this allows for another set of rules to be applied—such as those associated with direction of movement, vibration, sequence of events, time between events and so forth. For example: there may always be something falling down the left side; always something shaking (but never the same thing twice) and so forth. Images are particularly powerful as they stick in our memory well, especially if they are of something unexpected, out of context, the "wrong" color or orientation or to a different scale from a neighboring image within the GOTCHA.

Where the display mechanism supports interaction with the user, the GOTCHA can conform to an interaction rule—such as: if you click on the shoes they'll change color; if you hover over the image of an animal it will make the appropriate noise; if you click on the candle first and then the person they'll blow it out and so forth.

Figure 6:
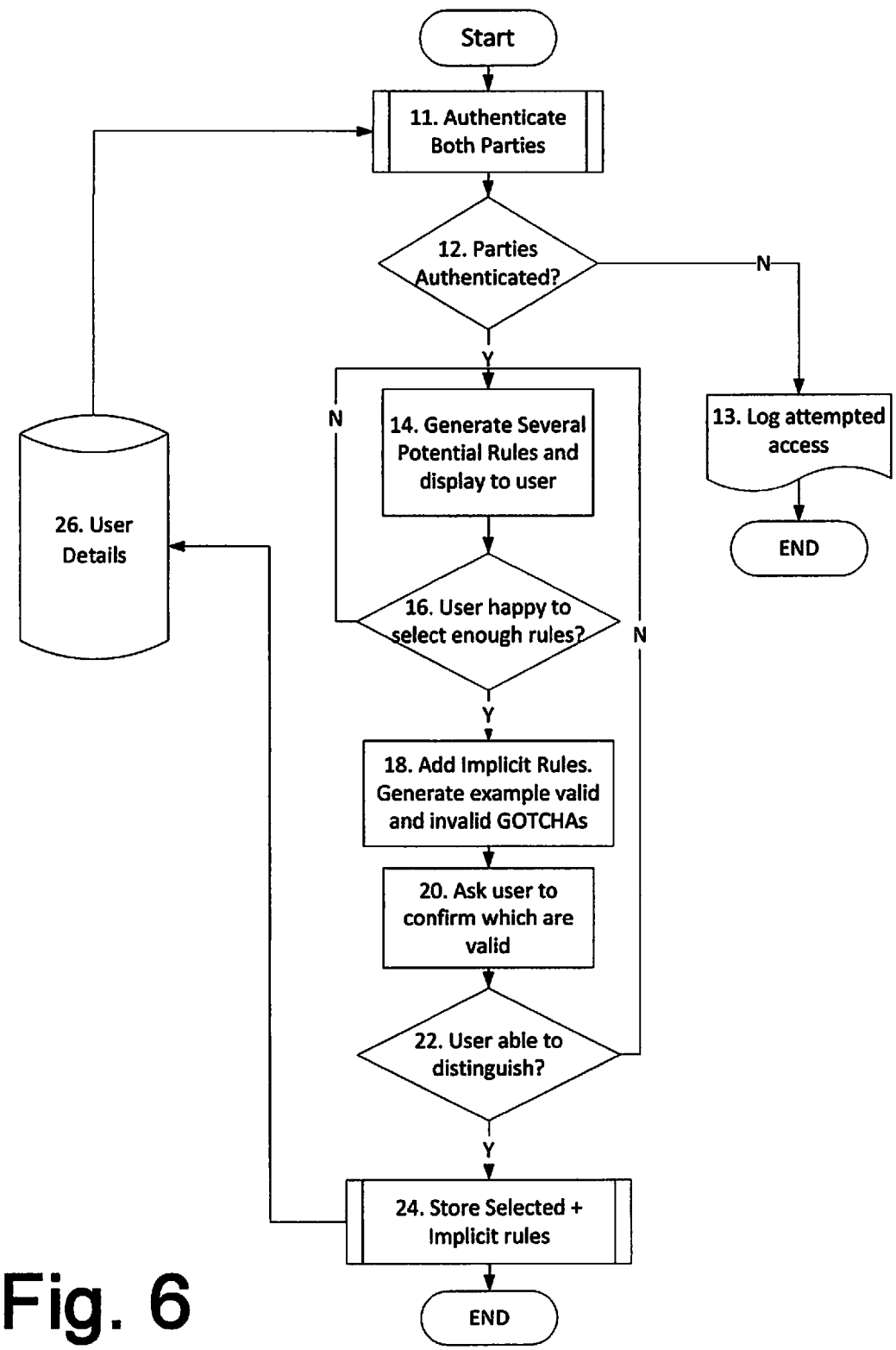
FIG. 6 is an illustration of a typical signup process during which the rule or rules to be applied to the GOTCHAs are determined.

As part of the initial sign-up or subscription process, the sender and recipient must both be aware of—and ideally agree on and confirm the understanding and application of—at least one rule with which the GOTCHA(s) will comply in messages that will be sent subsequently. This is typically done as shown in FIG. 6. A process such as this can be implemented entirely automatically—such as via a web interaction or by conversing with the customer, for example on a telephone call. The procedure typically requires that each party gains the trust of the other (11) by confirming details of the customer's account, the use of passwords, security questions etc. Should the authentication (12) fail, this should be noted (13) and suspicious activity investigated.

Assuming the parties have identified each other satisfactorily, the GOTCHA system will typically generate a set of perhaps five or six potential rules (14). Preferably, these are chosen from a wide base of possible rule types, each of which typically has one or more parameters. Each parameter can typically take one of many possible values—thus giving a very large number of distinct rules. Where possible, the nature of the rules varies widely. These might include, for example, one spelling or word-based rule; one musical rule; one image rule and one interaction rule.

These proposed rules are shown to the customer who is then asked to select one they feel comfortable with—i.e. can understand, expect to be able to apply and can remember easily.

The user can either select the required number of rules (which may be just one rule, at least on initial sign-up). Alternatively the user can ask for a fresh set of possible rules to be generated. Once the user has selected an appropriate set of rules (16) the system may optionally (18) choose a complementary set of rules which it will apply in addition to the one(s) agreed with the customer. For example, if the customer selects "A scalloped red border", the system may add "a wood textured background", "two words beginning with the same letter" and "a banana in any corner". Although these rules may not even explained to the customer, they will rapidly become part of what the customer expects to see.

Preferably, the system then generates and displays several exemplary GOTCHAs following the customer selected and automatically added rules. Some of these follow the rules while others do not. The customer is instructed (20) to indicate which ones follow the rules—for example by clicking a checkbox next to the valid ones.

Based on the user's input (22) the system can determine whether the user is able to distinguish valid from invalid GOTCHAs based on the rule they have selected (and the others added for them). Optionally, the user may be given the choice of changing the rule(s) should they have found them too difficult to interpret.

Once the user is happy with the rules and the system has proved that they can interpret the rules correctly, the rules (both those selected by the user and those added automatically) are stored (24) as part of that user's profile (26) and can be used to generate GOTCHAs as required the next time the customer is to be contacted.

Unlike with PINs (Personal Identification Numbers) and passwords, this approach allows the user to be steered away from the most obvious, and hence most easily guessed, options. By ensuring a good spread of types of rules and the parameters of each, the proportion of users who would be fooled by a GOTCHA following any one rule is tiny—unlike the proportion of users whose PIN is "1234".

Note that the temporal and/or spatial position of the GOTCHA(s) within the overall communication can also form part of the rule. If customer X is always shown an image GOTCHA immediately to the right of the personalized greeting, they will instantly recognise one elsewhere as a fake. This type of rule can easily be applied alongside the explicitly selected and agreed rule to provide further security without the customer even realizing that he is now checking two rules—one explicit and one implicit. The latter may have simply been stated in the instructions to the user as they selected the explicit rule.

Although manual GOTCHAs may be required to comply with multiple rules, the most user-friendly approach is that each complies with a single rule that is easy for the human recipient to remember and to apply to the GOTCHA. The beauty of the approach is that whilst the rule is very simple for the human to remember and apply, it is chosen from a huge number of potential rules, many of which are very difficult for a computer to apply. Even if the hacker knows what all the possible rules are, figuring out what it was about the GOTCHA that led the human to accept it is difficult.

As users become familiar with their GOTCHA rules, they can be explicitly taught or simply learn additional rules, increasing the sophistication and level of security provide by the GOTCHA.

Nevertheless, hackers will attempt to crack GOTCHAs and may use key-logging, screen-grabbing or man-in-the-middle techniques to obtain readable copies of one or more GOTCHAs. A number of measures can be taken to avoid the simple replication of a previous GOTCHA being considered valid—even with manual GOTCHAs.

Users may be advized that they will never be sent the same GOTCHA twice. Should they recognise a GOTCHA that they have seen before, they should immediately report it and ignore the message containing it.

This can be further enhanced by ensuring that no two successive GOTCHAs appear to be even vaguely similar. For example, at least in so far as the agreed rule(s) allow: the same words will never be used again; none of the elements making up a montage image will be reused; the background color of an image will be markedly different from the previous one etc.

Although not infallible, this does provide a further degree of protection from well-known hacking techniques. To overcome this challenge, a hacker must first determine what the significant rule or rules is/are. This can be made more difficult by using techniques common in CAPTCHA images—so that the content of the image is difficult to interpret in the first place (e.g. overlapping images; partially transparent images etc.).

A further challenge can be posed by the sender ensuring that each GOTCHA sent to a given customer not only follows the rule or rules agreed with and known to that customer, but also conforms to a plurality of other rules—any of which might, as far as a hacker is concerned, be significant to the recipient. Therefore a hacker, even when in possession of a sequence of genuine GOTCHAs may find a dozen or more rules that all of the GOTCHAs appear to follow. He cannot know for sure when or if he has correctly identified all of the rules that are significant to the recipient. The existence of multiple false trails makes it harder to identify the real rule.

This approach can be further refined by slowly changing the set of rules that are applied when creating valid GOTCHAs so that the intended recipient does not lose site of the rule that is actually important to them.

Message sequences can also be important and GOTCHAs can be used not only to authenticate the origin of a message but also to indicate its position in a sequence. This is particularly useful in email communications where messages are sometimes lost, deleted by accident or occasionally misidentified as "spam" or otherwise placed in a different folder. A range of rules can be applied to a sequence or time series of GOTCHAs that allows the user to recognise that a message in the sequence has been missed or duplicated. For example, using a text GOTCHA, the rule could be "There is always an 'X' in the two words presented and it is always one character earlier than in the previous message (and wraps from the end of the message back to the start of the message or vice versa when appropriate)." A graphical GOTCHA could follow a rule such as "the picture of a banana moves 45 degrees clockwise each time". Angular rules such as this work well with 90, 45 degrees or 30 degrees (corresponding to the twelve numerals on a clock face).

Loss of a message is easy to spot as the message following the loss breaks the sequence rule and a fake message probably has no "X" at all or repeated an earlier GOTCHA with different message body.

With such a rule, repetition of a valid message is easy to spot as the messages and their GOTCHAs are identical. As users become aware that successive GOTCHAs are deliberately very different from each other, they become sensitized to repeated ones—recognising at least something about the image or the words used and becoming suspicious enough to compare it with the previous (more likely genuine one). At this point they should notice not only that the two are identical but that the text around the genuine one (and the fake if the phisher has bothered to copy the style of the message carefully) explains that "Each image sent will be different from the last."—or words to that effect.

Note that a simple such sequential rule involves the insertion of a sequence number (4) visible to and easily readable by the human recipient. This can be obfuscated using CAPTCHA techniques—such as a patterned background (5) yet remain easily readable to the human recipient—even more so than a random CAPTCHA word as the reader knows roughly which number to expect and can certainly distinguish it from successive numbers.

As with the location of the GOTCHA (discussed above) so the presence of such a sequence number (4) within the GOTCHA can easily become an additional implicit rule—that the recipient does not consciously check for—but will notice if it suddenly vanishes, jumps around or is repeated. In this case, it may not even be necessary to mention the presence or significance of the number. The user will figure it out for themselves in most cases and certainly if they ever start to wonder "Have I missed a message?"

An extension to this approach is to provide a global or overall sequence number, which increments or advances by a known number (not necessarily one) on successive GOTCHAs intended for a specific recipient. This works well when GOTCHAs are generated not by each authorized message sender, as implied in the discussion thus far, but where a trusted service—such as a secure web-server with signed HTTPS credentials—is responsible for issuing GOTCHAs for one or more end users. Each authorized sender (41), (51), (61) must first authenticate itself with the GOTCHA Administration system (35) before it is given the appropriate GOTCHA, or—more securely—a link to the GOTCHA rather than the GOTCHA itself. This approach provides several benefits in addition to allowing an overall serial number (3) to be maintained for each end user.

Firstly, it allows the GOTCHA generator (32) to apply enhanced security to the GOTCHA. For example, an incoming request via a URL to the GOTCHA generator may only be satisfied if the link comes from a computer, smartphone or tablet (30) previously identified as belonging to the intended recipient. Access from other devices may be denied or may require some form of additional challenge. Note, however, that the latter approach may encourage phishing.

Secondly, the rule(s) held (36) in the GOTCHA Administration system, by which the GOTCHA was generated are never made visible to the party (41), (51), (61) that wishes to attach or embed the GOTCHA within their message. If GOTCHAs are created by each sender, then the end user must either remember many different rules or, more likely, will use the same rule over and over—making it less secure as it is known to many different senders, any of which could be compromised.

By keeping the rule (36) storage and GOTCHA generation (32) centralized for each user, they will be encouraged to use more complex (or simply more) rules than they would if they had to remember a separate set of rules for each sender (41), (51), (61).

In a sophisticated deployment, the GOTCHA may start to look very much like an image of a bank-note—albeit one of a personalized design. A long serial number (3) in one corner (though which corner is also an implicit rule—i.e. the user will notice if it's not where it normally is) provides the overall sequence number—which the user will sub-consciously note as odd should it be far from the recently received range.

A secondary, per-sender serial number (4) in another (variable but again consistent and significant) corner could be shown alongside, above, below or overlaid onto a small logo or icon (5) associated with that sender. Note that overlaying the serial number on top of the logo makes it more difficult to generate a copy with a different serial number as the underlying logo image will not be perfect in the fake.

A useful extension to the above is a hybrid topology in which part of the GOTCHA is provided by the user-centric GOTCHA system (35) while the remainder is provided by a GOTCHA generator (44) within the (authorized) sender's system (41), (51), (61). By having the two generators (44) and (32) provide complementary parts of an overall image, each of which obeys at least one rule known to and easily recognized by the recipient, a composite image can be shown that still allows the recipient to recognize a forged message even if either one of the two systems have been compromised and the rules held there have been divulged.

A useful technique in this case is the sharing of a transparency mask between the user centric GOTCHA generator (32) and the sender's GOTCHA generator (44). Using a file format such as PNG, this may include areas of total and/or partial transparency. By rendering the two partial images on top of each other, it readily becomes apparent that even though the forger may have compromised one system and learned the appropriate GOTCHA rules, they would be very unlikely to have compromised both and be able to fabricate a convincing GOTCHA.

Preferably, the area of the GOTCHA is divided into two regions—one of which follows the same, user-specific rules held in the database (36) of the GOTCHA Administration system (35) while the other region conforms to rules held by a particular sender (41), (51), (61). In the same way that the various denominations of a paper currency share some characteristics yet differ in others, so a family of GOTCHAs is formed that is instantly recognizable to its "owner" or intended recipient yet very different from those of other individuals. Imagine, for example a user whose long thin rectangular GOTCHAs always contain an oval area to the left of centre within which sender specific images are shown.

Security is further enhanced by subtly changing the detail of the "join" between the user-specific and sender specific regions. Gaps or overlaps can be made very obvious if, for example, concentric fringes are drawn around the edges. Any attempt to copy and paste the inner oval from a previously intercepted GOTCHA as described in the previous paragraph and paste it onto a different background will result in a "messy" join.

Figure 7:
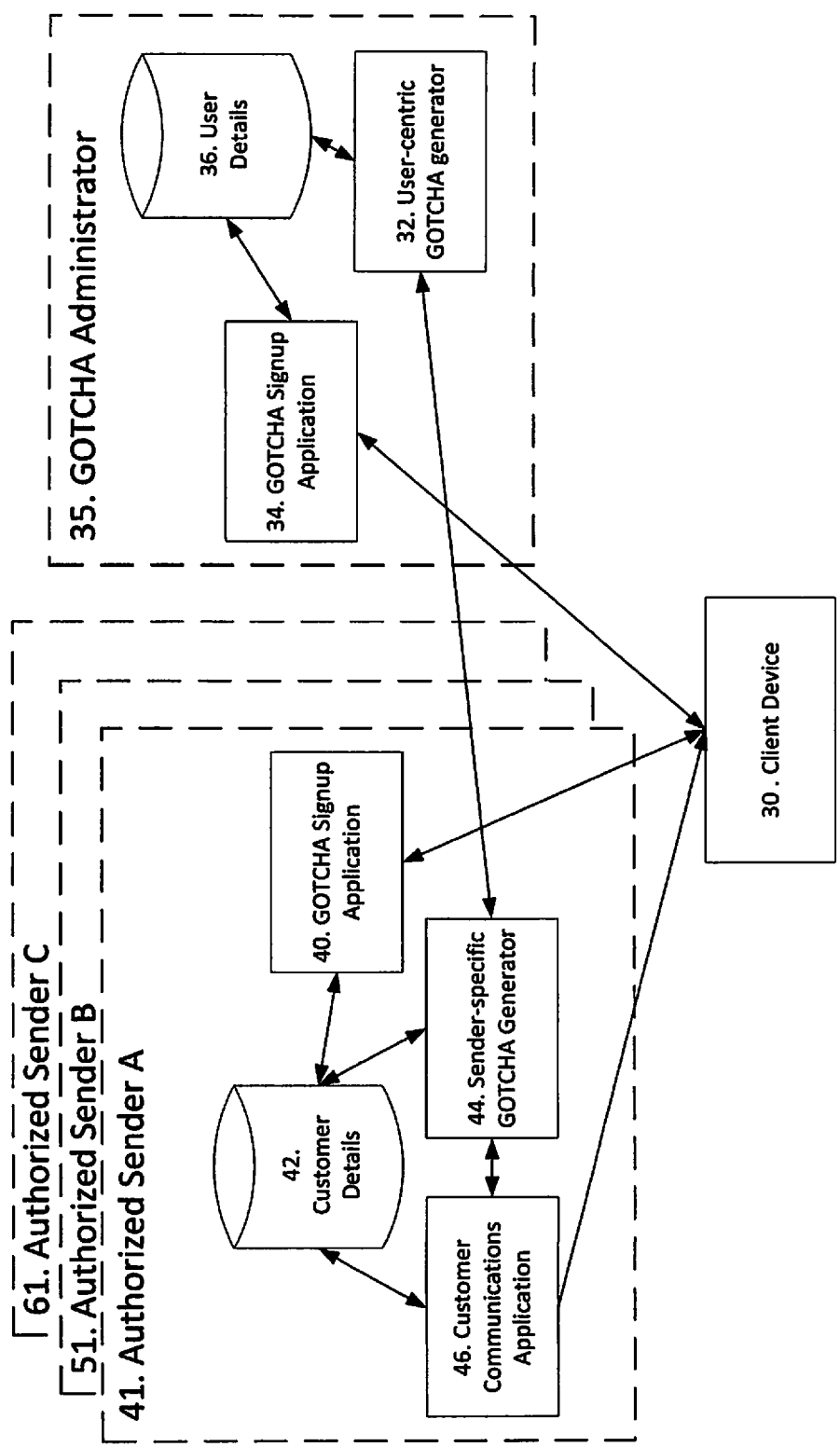
FIG. 7 is an illustration of a possible topology for the deployment of a sophisticated GOTCHA system in which part of the GOTCHA is generated by the sender of the message and part by a dedicated GOTCHA Administrator system.

FIG. 7 shows the main elements of a GOTCHA implementation. Each of the servers or applications can communicate with the others via any type of network communication: wireless, wired, packet or virtual circuits. The functionality can be spread across multiple servers or consolidated into fewer physical and/or virtual servers than shown in the diagram. The basic principles of operation are that a user accesses the system via one or more client devices (30). Note that a user often has access to multiple devices—for example, a SmartPhone, a tablet computer, an office computer and a laptop. Access to these services may be via native applications—such as a SmartPhone "app" or a more generic interface such an HTML browser interface.

To make use of GOTCHAs, the user must first register with (or be registered with) a GOTCHA user server (32). This holds or has access to a database (36) containing details that allow the user to be identified and authenticated when interacting with the server. The user interacts with an application that implements a signup process (34) such as that discussed earlier with reference to FIG. 6. In this interaction the user agrees one or more rules that will govern the (partial) GOTCHAs that are produced by the GOTCHA User Server (32) in response to requests from authenticated GOTCHA Sender applications such as (44).

The dashed box in FIG. 7 encloses the elements of the GOTCHA system that are typically required by an organisation that wishes to send messages containing valid GOTCHAs. Each organisation will already have a database (42) of its customer details, to which must be added additional information allowing it to retain knowledge of the rules agreed with the user when they interact with this sender's GOTCHA signup application (40). This also implements a procedure such as that of FIG. 6 but in this case the user is agreeing the rules which will be held in the sender's database (42) and will govern the generation of the (partial) GOTCHAs to be generated by this sender (44). Where sequence numbered GOTCHAs are to be used, database (42) must also store the previous or next message number and be updated each time a GOTCHA is generated.

Having signed up with the overall system via the user-centric GOTCHA Signup Application (34) and with at least one sender via that sender's Signup application (40), the sender can now generate GOTCHAs that will satisfy the client's expectations and hence be considered as valid. Whenever the sender's communication system (46) wishes to send a message to the registered GOTCHA user, it requests a GOTCHA from its local GOTCHA Generator (44), specifying the recipient in such a way that the rules and sequence number can be extracted from the sender's database (42). The GOTCHA generator application (44) requests a GOTCHA for this recipient from the GOTCHA User Server. This interaction will only succeed if the Sender's application (44) is authenticated using an appropriate SSL certificate or similar. The user-centric GOTCHA generator (32) looks up the recipient's rules in its database (36) and generates a partial GOTCHA which it sends to (or sends a link to) the requesting GOTCHA Generator (44). The remainder of the GOTCHA is generated by this application (44) and the merged GOTCHA or pair of partial GOTCHAs or links to the same are provided to the requesting Customer Communications Application (46).

Note that both the user-centric GOTCHA generator (32) and the sender's GOTCHA generator (44) will typically create a very complex GOTCHA that not only conforms to the required rules but also to a significant number of other rules—each of which acts as a false trail or "red herring" to any hacker that may gain access to the resultant GOTCHA. In choosing these additional rules, it is important to avoid trying to apply two or more conflicting rules—hence rules are ideally independent. For example "all corners are different shapes" and "opposite corners are the same shape" conflict and only one such "corner shape" rule can be applied.

Alternatively, where the GOTCHA has to be embedded in a variable location within the message—such as in the HTML body of an email—then the whole communication can be passed from the Communications Application (46) to the GOTCHA generator (44)—allowing the GOTCHA to be merged into the body of the message at the appropriate point—which typically varies from recipient to recipient. Where the message is in HTML, the location can simply be specified as before or after a specific tag or token within the message. The resultant message may then be forwarded to the recipient and ultimately viewed on a client device (30).

The recipient ultimately views the new communication from the sender (41) on one or more of his devices (30). There, the message is rendered, along with its embedded, attached or linked GOTCHA. Preferably, the GOTCHA takes the form of a well-known file or attachment format so that it is presented to the user regardless of whether or not there is any GOTCHA specific software present on the client device (30) and without the need for any knowledge of the user's GOTCHA rules.

For example, when a GOTCHA is inserted into an SMS text message, it is simply additional text added into the appropriate point within the message text. When a GOTCHA is sent with an Email, images will typically be sent as PNG, JPG, GIF or MPG files and hence displayed as would any other image of this type. Similarly, an audio GOTCHA would typically be included as an MP3 or WAV file or attachment and hence will be playable without any additional, GOTCHA specific software being installed on the client device. In fact, any known MIME TYPE or filetype which the receiving application understands and can render may be used (e.g. .XLS, .PDF, .DOCX etc.)

However, if additional GOTCHA software is loaded on or accessible to the recipient's device (30), then it may examine the file automatically or on request—for example, making use of embedded chunks with PNG, WAV, MP3 or JPG files—all of which are flexible, extensible file formats and can carry additional application-defined information that is harmless to and ignored by the default renderers but can be examined and acted on by the GOTCHA software to provide automated flagging of rules that have not been followed or to manipulate the data within a GOTCHA to reveal hidden watermarks etc.

In the case of a manual GOTCHA, it is up to the recipient to infer whether or not the GOTCHA is valid. In the case of an automatic or hybrid GOTCHA, a helper application, applet or web service must be invoked to process the received GOTCHA. This may provide one or more modified renderings of the GOTCHA (using some or all of the rules by which it was generated) and/or report on the validity of the GOTCHA according to some or all of the rules that it should obey.

Note also that a simpler system in which the "user" and "sender" elements are conflated into a single system is also viable—but the user will not then see consistency of any GOTCHA rules across different such systems.

The bank-note analogy can be taken further, using complex and convoluted borders and frames around the outside of the image. As with other aspects of the GOTCHA, the user will learn, without being told, that some aspects are constant while others always change. For example, user A's GOTCHAs may always have three concentric frames, the centre one of which is always thin and red while the outer two change color but always have stripes at forty-five degrees forming a chevron pattern. Scalloped edges, rounded corners and other embellishments can also be used as GOTCHA rules.

Thus the recipient is only consciously applying the one explicit rule he chose from a list of widely differing rules he was offered, but is sub-consciously checking the location of the GOTCHA within the message and the monotonically increasing sequence number within the GOTCHA.

Even so, there is a danger that the recipient does not actually bother to check the one explicit rule agreed. This can be discouraged by including standard text around or near the GOTCHA (or spoken instructions over an audio only channel) urging the recipient to check that this image obeys the agreed rule(s) and to report the message rather than do as it says if it does not. The text should also include the location of the GOTCHA to reinforce the implicit rule of GOTCHA location (which differs from recipient to recipient). For example, a user whose GOTCHA is always shown top left above the greeting may find this text to the right of the GOTCHA every time: "The image in the top left corner should comply with the rule we agreed with you. If it does not, please forward this forged message to phishing@largeco.com and do NOT act on its contents."

There is also the chance—especially where messages are few and far between—that the user forgets the explicitly agreed rule(s). There is therefore a benefit in reminding the user of these rules and confirming that they still remember them. This can be done, for example, by advising the user at the time they select the rule, that "From time to time, we will ask you to select which of three images are valid. We will never ask you to describe the rule you choose or to classify more than three images. If you forget the rule, you can choose a new one by . . . ."

In such a case, some of the messages sent can include, in addition to the valid GOTCHA(s) in the expected location(s), a set of other GOTCHAs, only one or some of which are valid. The user is asked to click on the valid GOTCHA(s) and their selection is conveyed to the sender's servers (typically via a hypertext link associated with each image). This allows the sender to determine whether the recipient is still able to recall the rule(s) and hence identify a valid GOTCHA from an invalid one.

Note that similar techniques can be applied over voice only channels. For example one phone call in five may end with an IVR (Interactive Voice Response) dialog along the lines of "Please help us confirm that you recall the rule we use to identify ourselves to you. If 'cat elephant' is valid please press '1'. If 'dog watershed' is valid please press '2'."

Likewise, in a text only environment such as SMS, a challenge/response such as the above can take the form of a message in the (case-sensitive) form "Please reply with the number of the word that is a valid greeting from the following: 1:Bananas 2:eLephanT 3:eGgplant" (in this case, the rule was "second letter and only second letter in uppercase"—hence "2" is the correct response).

In all cases, such challenges implicitly reinforce the paradigm that "we will never ask you to describe the rule—only to apply it." Users will therefore become sensitive to requests for them to describe the rule and suspicious of anyone asking for it—in the same way that some banks have educated users to be wary of anyone asking for more than a few specific letters from their "well-known information" (Lloyds TSB™ personal online banking for example).

Confirming that you know how to recognize a good image from a bad one as above can be seen as a chore and therefore avoided or at least grumbled about. Turning this into a game or providing a reward for getting it right encourages it to be done more frequently and conscientiously.

One such approach is to present four or five frames of a cartoon strip beneath the instructions "Click on the frame that follows the agreed rule to reveal the punch-line. We will NEVER ask you to reveal our agreed rule or to enter your password as a direct result of this selection." Clicking on the appropriate image reveals the final frame and, optionally, notifies the sender's server that a correct identification was made. Clicking on any of the other images notifies the sender's server that the recipient has either forgotten or cannot apply their GOTCHA rule, or is an imposter. Although the message containing this cartoon strip should itself be genuine (as evidenced by the valid GOTCHA within it) there is a danger that phishers could persuade users to enter their passwords or other credentials into a fake website at this point and then persuade them that the agreed rule has been changed. It is therefore important that the message above this cartoon (or other confirmation mechanism) is always clear that you will not be asked for your credentials now. Having seen such a message several times, the user will be suspicious should it not be present on a later, forged message.

The "gamifying" concept can be taken further if the GOTCHA can be associated with an application, applet, ActiveX control or other means of running GOTCHA specific code. This can be done in a variety of ways, including but not limited to: dragging the GOTCHA image to a pre-installed application and dropping it on it; saving the GOTCHA to a pre-defined folder which is being watched by a pre-installed application; preferably, for email or instant messaging channels, by identifying the GOTCHA as a new MIME-TYPE and associating it with a pre-installed application or email client add-in. Regardless of the mechanism, the end result is that the content of the GOTCHA is made accessible to the GOTCHA client program.

This client program may render the GOTCHA graphically and/or process other information within the GOTCHA. For example a GOTCHA may be in the form of a "PNG" ("Portable Network Graphics") file. This is a widely used format for transmitting images using lossless compression. The file format allows for additional, optional, content to be included within the file. Renderers that are not aware of this GOTCHA specific content can still render the image but the GOTCHA application will interpret this additional information. The embedded information may contain encrypted and/or plain text content. This content may indicate a range of attributes, including but not limited to: date and time of transmission; expiry date/time; sequence numbering; sender's signature; recipient's signature etc. These can be used by the program to determine automatically the validity of the GOTCHA and/or to influence how, where and when it is rendered.

One particular benefit of using the PNG format is that it optionally supports total and partial transparency in addition to RGB color values. This can be used to great effect in graphical GOTCHAs. It will be appreciated that other file formats, such as "GIF" (Graphical Interchange Format) or "JPEG" (Joint Pictures Expert Group) formats could be used. Each has different compression, loss and artifact characteristics that may limit or at least influence the scope and nature of "rules" used in the creation and subsequent verification of GOTCHAs.

In one embodiment, each GOTCHA forms just one part of a larger image that builds up piece by piece as each message is received and its GOTCHA is added to the recipient's collection. A fixed size composite image can be built from identically sized component images—each of which represents an image that is mostly transparent. Alternatively, each individual GOTCHA can be smaller than the overall image but contain within it (or in associated metadata) a definition of the offset (and optionally, rotation or other transformation) to be applied to it. As each piece has the appropriate transformation, it fills in a piece of the overall image like a single jigsaw puzzle piece contributing to an overall picture.

The gamification can be taken further by asking users "Can you tell what it is yet?" (with apologies to Rolf Harris). This encourages users to pay attention to the images—especially if rewarded with additional value should they guess the image before it is complete.

Alternatively, each GOTCHA may add a new section to a game, extending the space within which the game can be played or by adding a new "level" after so many messages.

This brings us to an example of a hybrid-GOTCHA. If the image within a single GOTCHA is actually cut from a larger picture—with the rest of its pixels being transparent—then it is even easier for a human to spot that a fake jigsaw puzzle piece does not match. Not only will the composite picture not make sense—with the new piece obviously not contributing properly to the overall picture, it won't actually abut tightly to the existing pieces. While a human will spot gross errors in the fit of such jigsaw puzzle pieces, the application will be able to spot even a single pixel overlap or gap that should not be present on the boundary between neighbouring GOTCHAs.

Thus, in addition to cutting portions of the overall picture that look like traditional jigsaw puzzle pieces at a macro level, it is beneficial to make the edges of the pieces randomly shaped at a pixel level. It is extremely difficult for a forger to not only match the content of the image but also the complex shape of its edges abutting the existing shapes. Even if they succeed in this, and insert a forged message into the sequence, the presence of the next real message will flag a problem as it will overlap almost entirely with the forged piece. Furthermore, even if the phisher manages to prevent the next genuine message reaching the intended recipient, they cannot possibly have predicted the pattern on the edge of the genuine message and hence will be exposed when the next piece of the jigsaw puzzle does not join up with their fake piece. By ensuring that most pieces touch more than one other piece, it is then straightforward to identify which of the received pieces is the fake as all edges with it will fail to abut their neighbours' cleanly. Unlike a real jigsaw, this one can be considered to wrap left edge to right edge and top edge to bottom edge thus ensuring that all pieces are adjacent to at least four other pieces and fake pieces can be identified wherever they are positioned.

Alternatively, the jigsaw may be never-ending—with new pieces extending it ever downwards (the top rolling off or only visible via a scroll-bar). This works well for vouchers or tokens. These provide another reason to pay attention to the GOTCHAs—as they can build into something worthwhile. This may be an ongoing cartoon strip, a story or money-off vouchers. The latter could include barcodes or Quick Response Codes (QRCs) that are only complete and hence valid once several GOTCHA puzzle pieces have been assembled. These are particularly useful where GOTCHAs are part of a interaction undertaken on a mobile phone or tablet as they are compact enough to show on screen yet can be scanned at point of sale outlets to redeem the voucher.

By rewarding the user as GOTCHAs accumulate, this approach can also serve to encourage actions on the part of the user that will lead to more messages and hence GOTCHAs being received. For example, a bank sending a message each time a credit card is used may find that users make more use of their credit card if they get hooked on the game that their GOTCHAs build into or they like the coffee vouchers they earn. Ideally, users are given a choice of the type of GOTCHA and hence rewards they accumulate.

A variant on the puzzle theme is to use overlapping data from one message to the next. This is particularly useful in, for example, emails advising a user of credit card transactions. Such services are susceptible to phishing attempts as, although it is difficult to spoof a message showing a valid transaction, it is easy to make one up in which the user is advized of a completely fictitious payment having been made. The user, on receipt of such a message, assumes that their credit card has been cloned and wishes to alert the card issuer to this problem so that subsequent transactions are blocked. The phisher's email merely needs to direct them to a fake site that mimics the card issuer's website and asks them to enter their card details, PIN etc. to "confirm that the card should be blocked".

The above can be foiled by including at least a portion of the previous transaction within an email. If this is always done, then the recipient is immediately suspicious of an email that only contains a new, invalid transaction or attempts to show a previous transaction but that, too is made up—and does not match the one in the previous genuine notification email. Sending the whole of a previous transaction is itself slightly dangerous as credit card companies often use knowledge of previous transactions to authenticate a user when talking to them on the phone. Hence sending details of more than one transaction in a single email is unnecessarily dangerous. This can be avoided by using techniques similar to those commonly used on till or ATM receipts—where only some of the card's digits are shown, i.e. enough to prove that the sender almost certainly does know the whole card number but not enough that a fraudster can make use of what has been sent.

Thus an email advising a user of one or more new transactions may include a copy of the last line of the previous batch of transactions, but with some of the important characters redacted or otherwise obscured or dropped. As this technique works with text, it can also be used on text only communications channels such as SMS—with the obscured digits sent as "*" (as used to show password entries). With a communication channel capable of graphical display, the obscured items can preferably be represented as the indents in a jigsaw puzzle piece. This implicitly reminds the user that these should join, seamlessly, onto the end of the previous message. This can be further reinforced by a faint outline of a similar pattern over the last transaction on each statement.

A further approach to encouraging users to pay attention to and learn the characteristics of their GOTCHAs is to have them contain or be associated with some text (the rendering of which may or may not be related to the recipient's rule). As the GOTCHAs form a composite, larger picture, the text may provide an interesting trivia fact, a recipe or tip. Alternatively the pictures could build into a larger image that can be used as wallpaper and/or screen saver.

In an alternative approach, the recipient may already be aware of the overall image that is building up—having been shown a smaller version of it and selected the image instead of any of the typical human interpretable rules described thus far. The GOTCHA builder is automatically checking the fine detail of the image pieces as they are received but the recipient is also comfortable that all is well as they can see the pieces starting to form the picture they are expecting—for example a high resolution portrait of their favourite breed of cat or the lines of their favourite song in the case of an audio GOTCHA. A phisher will have had to have intercepted the initial sign-on session in which the thumbnail was chosen AND be able to predict the precise shape of each jigsaw puzzle piece to circumvent this approach.

It will be appreciated that the format and content of the GOTCHA may be selected from a wide range of existing file types (e.g. ".WAV", ".JPG", ".MPG"). Many of these formats allow for user extensions within which the additional GOTCHA fields can be embedded. Alternatively, each authorized sender can create their own, unique file format, choosing from a range of potential encoding, blocking and encryption techniques such that only their own GOTCHA client can read the GOTCHAs they generate.

Where communication between sender and recipient occurs over more than one channel (e.g. SMS text and email) cross media GOTCHAs can be used to provide even more rigorous proof that a message is from the sender it purports to be. One or more rules can be agreed that will link the GOTCHAs used on the two (or more) media. For example, the second word in the SMS GOTCHA will also appear as an anagram in the image GOTCHA contained in the email. As before, the sheer variety of rules that can be concocted yet remembered relatively easily makes this difficult to hack.

Where audio and graphical images are supported together, rules may be based on links between them. For example, an incongruous sound—such as a dog barking when a picture of a cat is shown—may be used as a significant rule. Similarly, lip-synchronisation, or deliberate failure thereof is also easy for the human to identify (while difficult for a computer to interpret) and thus makes a good rule.

In a similar vein, rules can encompass both text and images. For example, a GOTCHA rule may state that the text within the GOTCHA will describe an object incorrectly (e.g. "Green Banana" in the text when the image shows a green apple or a yellow banana).

Where a received GOTCHA is displayed by a GOTCHA client application, other tricks and techniques used in banknotes and official documents can be adapted to provide further security layers.

One example of this is a digital analog of the ultra-violet lamp test. When held under an ultraviolet light, many banknotes show a (normally) hidden pattern. The same effect can be achieved by, for example, manipulating the color map used to display a graphical image. There are many possible transformations that can be used. These range from a simple non-linear mapping of colors that greatly enhances the contrast within a certain range (for example, if all red or "R" values in the RGB color code below 250 are replaced with 0 while the values 251 through 255 become 50, 100, 150, 200 and 250 then patterns that would be indistinguishable to the human eye become very apparent) to complex bit transformations. Masking out the green and blue to only show the red, as would happen to an image seen under a red light then exposes this pattern fully.

Unlike normal cryptographic techniques, these are not intended to obscure a "message" but rather to provide the recipient, very rapidly with great confidence that if he can see the complex and sophisticated pattern he was expecting, then the sender should be trusted to be who they claim to be.

Preferably, the human recipient can be shown the hidden image using pictures that mimic the real world. For example, the hidden image may be shown over a picture of the GOTCHA being held under a hand-held ultra-violet lamp—in the same way that a human would examine the ultra-violet marks on a banknote. This helps to convey the principle of the security mechanism without the need for written instructions—and is hence more easily understood and more easily supported in all languages.

A further approach used in banknotes is watermarking. There are many ways in which something similar can be achieved in these images. Unless the forger knows which algorithm (of many, many possible algorithms) is going to be applied when viewing the GOTCHA he is trying to forge, it will be impossible for him to generate a convincing fake. An example algorithm might be that the least significant bit of all, or a subset of pixels in the image is modified such that when combined with that of a particular neighbouring pixel in a particular way (e.g. an XOR function) and then displayed in monochrome (where 0 is black and 1 is white) a particular image is displayed—which the user will recognise.

Preferably, as with the "ultra-violet" test above, the human recipient can be shown the watermark using imagery that mimics the real world. For example, the watermark image may be shown over a picture of the GOTCHA being held up to a strong light—in the same way that a human would examine the watermark of a banknote.

In the art world, the presence, position, accuracy and style of a signature on a picture helps to confirm its authenticity. So too, in a GOTCHA the presence of a distinguishing mark somewhere on the image can be one of the "rules" used to confirm its veracity. This mark could be a full signature but is more likely to be one or more initials or a simple shape and take up a very small portion of the overall image. The characters could be in one or more distinctive fonts or even hand-drawn by the recipient—for example on a touchscreen or mouse-pad. The location, color and orientation of the signature are also important factors used in identifying a genuinely "signed" GOTCHA from a fake. As with a CAPTCHA, this "signature" may be deliberately obfuscated. For example, it may always appear in the bottom left corner of the "frame" of the GOTCHA image—which itself has a variety of colors and textures.

The "texture" of the material is also important, both in the case of banknotes and works of art. So too, a "texture" can be overlaid onto the whole surface of a GOTCHA or, unlike the physical analogs, different textures can be applied to different elements of the image. These "textures" may be visible to the human eye—giving the look of canvas, rough paper, "speckling", wood grain etc. or invisible to the human eye but discernible to the GOTCHA client via a texture recovery algorithm which can then enhance them before showing to the human. For example, it may show an image of a magnifying glass within which is visible the "magnified" irregular weave like that of a handmade paper.

As well as applying "texture" to all or part of the image, one or more lines can be added to the image. As when used in CAPTCHA images, these have the effect of making it harder for an automated tool to decipher the content of the image but are readily discernible to the human recipient of an image. Multiple random lines can be used to create a "crackle-glaze" effect or other recognizable style of disruption to the main image. That style, the color, the position of the lines or the shape of one or more lines may obey a further rule that allows the recipient to distinguish a valid GOTCHA from a fake.

In audio GOTCHAs, the "texture" can be the background noise or may be a particular form of distortion. For example the start or end of a word may be clipped.

A further refinement can be thought of as an analog to the hidden images in official documents that result in photocopies or scans of important documents such as passports or driving licenses clearly showing "FAKE", "COPY" or similar disparaging words across the resultant copy. These typically exploit the limited (and often standard) resolutions at which photocopiers and scanners sample the image when copying it. A similar mechanism can be employed by the GOTCHA viewer. For example, a particular viewer may be configured to take every Nth row and every Mth column to produce a lower resolution image which was effectively embedded yet hidden within the overall image. This can be combined with the color mapping or watermarking techniques above to embed a known image within the main image in a way that is very difficult to detect unless the underlying algorithm is known.

A more sophisticated form of the above could use a mechanism analogous to the tumblers in the lock of a safe. For example, the rule known to the GOTCHA generator and the GOTCHA client application may involve a known "origin" and a series of angular rotations, each of which applies to a successive concentric ring of pixels about that origin. By rotating each ring of pixels by the appropriate angle and, optionally, applying the color transformation, watermarking or other operation, a hidden image may be revealed.

Although a physical set of concentric squares cannot be rotated within each other, the concentric squares of pixels about the origin can be shuffled easily. Hence, given the orthogonal axes used for pixels within most computer images, a computationally simpler approach with similar results is to treat the perimeter of each concentric square about the origin as if it were a continuous ribbon of pixels and move the pixels clockwise or anticlockwise around that perimeter by a specified number of pixels. The number of pixels to move may be derived from a formula involving the distance from the origin or simply a list of otherwise unconnected offsets.

In the general case, any algorithm can be used that provides for a wholly or largely reversible manipulation of one image or a combination of a second ("watermark") image with a primary image. The encoding algorithm is implemented in the GOTCHA server application to generate the GOTCHA while the decoding algorithm is implemented in the GOTCHA client to restore the image or images. Where the algorithm allows the exact reconstruction of the original image or images, it is easy to build an automated test harness that generates test images—typically including randomly generated ones which, to the human, appear as a random mess of multi-colored pixels.

By submitting these test images to the encoding algorithm, a GOTCHA is generated. This can be compared against the original image(s) using well known image comparison techniques to gain a measure of how well obfuscated each of the original images is. By then submitting the GOTCHA to the decoding algorithm, the original image(s) should be restored. In the case of a lossless and hence reversible algorithm, every pixel should be identical to that of the original image—allowing for an automated certification process. Where the recovered image is, for example, blurred or has reduced color depth compared to the original, then more sophisticated techniques must be used to determine whether or not the algorithm has succeeded. Such algorithms could include deliberate reduction of color depth, edge-blurring etc. if the effect of the transformations can be quantified and simulated. Failing this, the similarity between the original image(s) and resultant image(s) can be measured using the same tools by which the obfuscation was measured—but this time a "good" score is a high similarity with the original image.

A sophisticated GOTCHA viewer can extract the various hidden images from within the main one and display all of these for the user to view. Even without being told, the user will rapidly learn several facets of a valid GOTCHA and be aware of a fake should any of these not be present. Unlike the green address bar of a browser that tells us that a website has a valid certificate, the level of instant comfort and confidence that is gained by seeing a sophisticated GOTCHA displayed—especially with the simulated "watermark" and "ultraviolet" renderings alongside the original—allows the user to feel much more a part of the validation process than relying on the invisible "magic" of the cryptographic techniques that may also be being used in the reception of the message.

The presence of a sophisticated GOTCHA within a message will become a deterrent to forgers as they will immediately realize that any attempt to inject fraudulent communications will be seen for what it is and not fool the recipient. The widespread adoption of the techniques described herein should make phishing emails both easier to spot and much less common. No longer will it be possible to simply obtain a list of email addresses from somewhere and have a viable percentage of the recipients taken in by a mass-produced message.

It will be appreciated by one of skill in the art that the functionality of the algorithms described above can be implemented in a wide variety of ways. The functionality can be partitioned between client, server and intermediate processors and can be run on any processor from a mobile phone to a highly parallel server farm. The features can be offered as applications or via "software as a service" interfaces running locally or "in the cloud" on any appropriately connected computing platform. The skilled person will be aware of a range of possible modifications of the various embodiments described above. Accordingly, the present invention is defined by the claims and their equivalents.

What is claimed is:

1. A method for authenticating a message; the method comprising the steps of:
    creating, using a server computer comprising at least a first processor, a first memory, and a first software module stored in the first memory and operating on the first processor, the first software module configured to generate digital tokens each comprising a graphical image, a plurality of user-specific digital tokens associated with a first user, wherein each of the plurality of user-specific digital tokens is created according to a set of at least two rules known to the first user;
    receiving, at a communications software application stored in a second memory and operating on a second processor, the second memory and second processor resident on a sender computing device, a message from the first user to a recipient that requires authentication of the recipient;
    associating a digital token from the plurality of digital tokens created for the first user with the message, at least one of the rules used to create the associated digital token being known to an application capable of being stored and operated on a plurality of client devices, at least one of which is associated with the recipient; and
    sending, using the communications software application, the message with the associated digital token from the first user to the recipient via a network;
    wherein at least one of the set of rules used to create the associated digital token is configured to allow visual verification by the recipient that the rule has been satisfied;
    wherein the digital token associated with the message incorporates an element of a previous message sent from the first user;
    wherein the graphical image is divided into a plurality of substantially constant areas such that in successive messages each such area is populated by a specific application, wherein at least one of the areas is always populated according to the same set of rules, regardless of the originator of the message and/or a set of rules that is specific to the originator of the message and/or the precise boundary between the areas varies from one message to the next while retaining the general shape and size of each area; and
    wherein digital tokens associated with successive messages are different from each other.

2. The method of claim 1, wherein a second digital token associated with the message comprises at least one of: a set of characters; an audio signal; and a moving image.

3. The method of claim 2, wherein at least one of the digital tokens associated with the message describes and/or provides means of responding to one or more user interactions.

4. The method of claim 1, wherein the rules include the spatial and/or temporal location of the associated digital token within the message.

5. The method of claim 1, wherein the rules relate to at least one of the size, shape, resolution, aspect ratio, color, pattern, texture, border, translucency of the graphical image; presence of, absence of, number of, orientation of, size of, color of, resolution of or sequence of specific or generic sub-image or sub-images, representation of text within the image, wherein for text the rules relate to the characters within, the words within, the position of, the color of, the orientation of, the font of, the style of or the size of the text within the image.

6. The method of claim 1, wherein at least one of the digital tokens associated with the message is partially or fully obfuscated.

7. The method of claim 1, wherein the digital token associated with the message comprises a plurality of characters, and the rules comprise at least one of: the order, number, sequence of characters, case of characters, presence or absence of whitespace or punctuation characters or relationships between characters, the presence of, absence of, length of or order of valid words, anagrams, interleaved words, specific words or categories of words within the character sequence.

8. The method of claim 1, wherein the rules relate an attribute of one type of digital token to an attribute of a different type of digital token.

9. The method of claim 1, wherein at least one digital token incorporates a number or representation of a number that changes from one message to the next, wherein the number or representation of a number is a sequence number of the message within a set of messages sent from all authorized senders or from a subset of all authorized senders or from a specific sender.

10. The method of claim 1, wherein rules unknown to or unused by the intended human recipient are applied to the digital token.

11. The method of claim 10, wherein at least one of the recipient unknown or unused rules applied is changed each time a digital token is generated using the at least one of the recipient unknown or unused rules.

12. The method of claim 1, wherein the digital tokens associated with successive messages are combined to build a larger digital token, the larger digital token being one of: a jigsaw, a story, puzzle or trivia fact, a series of cartoon frames, a larger image, a voucher or token, a bar-code or Quick Response Code.

* * * * *